(12) United States Patent
Khoshnevisan et al.

(10) Patent No.: US 11,751,209 B2
(45) Date of Patent: Sep. 5, 2023

(54) ACKNOWLEDGEMENT FEEDBACK FOR MULTI-COMPONENT CARRIER SCHEDULING WITH SEPARATE FEEDBACK-RELATED CONTROL FIELDS

(71) Applicant: QUALCOMM incorporated, San Diego, CA (US)

(72) Inventors: Mostafa Khoshnevisan, San Diego, CA (US); Kazuki Takeda, Tokyo (JP); Xiaoxia Zhang, San Diego, CA (US); Peter Gaal, San Diego, CA (US); Alberto Rico Alvarino, San Diego, CA (US); Huilin Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/154,362

(22) Filed: Jan. 21, 2021

(65) Prior Publication Data
US 2021/0258997 A1 Aug. 19, 2021

Related U.S. Application Data

(60) Provisional application No. 62/976,901, filed on Feb. 14, 2020.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04L 5/0055* (2013.01); *H04W 72/0446* (2013.01); *H04W 72/535* (2023.01)

(58) Field of Classification Search
CPC .......... H04W 72/1289; H04W 72/042; H04W 72/0446; H04W 72/1257; H04L 1/1819;
(Continued)

(56) References Cited

U.S. PATENT DOCUMENTS

| 9,179,458 | B2 | 11/2015 | Park |
| 2013/0301600 | A1 | 11/2013 | Park |

(Continued)

FOREIGN PATENT DOCUMENTS

CN 102238641 A 11/2011

OTHER PUBLICATIONS

International Search Report and Written Opinion—PCT/US2021/014771—ISA/EPO—dated Apr. 21, 2021.

*Primary Examiner* — Mang Hang Yeung
(74) *Attorney, Agent, or Firm* — Holland & Hart LLP

(57) ABSTRACT

Methods, systems, and devices for wireless communications are described. A user equipment (UE) may provide hybrid automatic repeat request (HARQ) feedback for multiple physical channels (e.g., multiple physical downlink shared channels (PDSCH)) scheduled via cross component carrier scheduling. A base station may transmit downlink control information (DCI) messages via physical downlink control channel (PDCCH), to the UE to schedule the multiple PDSCH over multiple component carriers. The UE may monitor for the multiple PDSCH over the multiple component carriers, respectively. The UE may identify resource allocations to use for HARQ feedback transmissions associated with the multiple PDSCH, based on the DCI messages received. The DCI may include a number of control fields that the UE may use to determine resource allocations to use for the HARQ feedback transmissions. The UE may thus (Continued)

improve coverage for wireless communications by supporting HARQ feedback for multiple PDSCH scheduled via cross component carrier.

30 Claims, 17 Drawing Sheets

(51) Int. Cl.
*H04W 72/0446* (2023.01)
*H04L 5/00* (2006.01)
*H04W 72/50* (2023.01)

(58) Field of Classification Search
CPC ... H04L 5/0055; H04L 1/1854; H04L 5/0092; H04L 5/001
USPC .......................................................... 370/329
See application file for complete search history.

(56) References Cited

U.S. PATENT DOCUMENTS

| | | |
|---|---|---|
| 2016/0020875 A1 | 1/2016 | Seo et al. |
| 2019/0394009 A1 | 12/2019 | Yoshimoto et al. |
| 2020/0127773 A1* | 4/2020 | Papasakellariou ........................... H04W 72/0406 |
| 2022/0007399 A1* | 1/2022 | Rastegardoost ...... H04L 1/1819 |
| 2022/0167375 A1* | 5/2022 | Papasakellariou .... H04L 5/0053 |

* cited by examiner

ACKNOWLEDGEMENT FEEDBACK FOR MULTI-COMPONENT CARRIER SCHEDULING WITH SEPARATE FEEDBACK-RELATED CONTROL FIELDS

CROSS REFERENCE

The present application for patent claims the benefit of U.S. Provisional Patent Application No. 62/976,901 by KHOSHNEVISAN et al., entitled "ACKNOWLEDGEMENT FEEDBACK FOR MULTI-COMPONENT CARRIER SCHEDULING WITH SEPARATE FEEDBACK-RELATED CONTROL FIELDS," filed Feb. 14, 2020, assigned to the assignee hereof, and expressly incorporated by reference herein.

FIELD OF TECHNOLOGY

The following relates generally to wireless communications and more specifically to acknowledgement feedback for multi-component carrier scheduling with separate feedback-related control fields.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support multiple component carriers for communications between UEs and base stations.

SUMMARY

Various aspects of the described techniques relate to configuring a communication device, which may be otherwise known as user equipment (UE), to provide hybrid automatic repeat request (HARQ) feedback for multiple physical channels (e.g., multiple physical downlink shared channels (PDSCH)) scheduled via cross component carrier scheduling, for example, in fifth generation (5G) systems. Some aspects of the described techniques may provide for higher data rates and greater spectral efficiency in spectrum sharing contexts (e.g., in New Radio (NR) dynamic spectrum sharing (DSS)). For example, the described techniques may provide for receiving multiple physical channels over multiple carriers and acknowledging receipt of each of the multiple physical channels by providing HARQ feedback while maintaining low signaling overhead and system flexibility. A base station may transmit control information in a physical downlink control channel (PDCCH), such as downlink control information (DCI), to a UE to schedule multiple PDSCH over the multiple component carriers. The UE may monitor for the multiple PDSCH over the multiple component carriers, respectively.

The UE may decode the multiple PDSCH and transmit feedback (e.g., HARQ feedback) to the base station based on successfully, or unsuccessfully, decoding the multiple PDSCH. In some examples, the UE may identify resource allocations to use for feedback transmissions associated with the multiple PDSCH, based on the DCI received from the base station. For example, the DCI may include a number of control fields that the UE may use to determine the resource allocations to use for feedback transmissions. In some examples, the UE may use a first set of the fields to determine a first resource allocation for feedback transmissions associated with a first PDSCH and may use a second set of the fields to determine a second resource allocation for feedback transmissions associated with a second PDSCH. In some aspects, the first resource allocation and the second resource allocation may be different. In some other aspects, the first resource allocation and the second resource allocation may be the same. The UE may thus increase coverage for wireless communications by supporting HARQ feedback for multiple PDSCH scheduled via cross component carrier scheduling.

A method of wireless communication at a UE is described. The method may include receiving a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determining the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmitting, on one or more uplink control channels, the first acknowledgement information and the second acknowledgement information.

An apparatus for wireless communication is described. The apparatus may include a processor, memory in electronic communication with the processor, and instructions stored in the memory. The instructions may be executable by the processor to receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmit, on one or more uplink control channels, the first acknowledgement information and the second acknowledgement information.

Another apparatus for wireless communication is described. The apparatus may include means for receiving a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determining the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmitting, on one or more uplink control channels, the first acknowledgement information and the second acknowledgement information.

A non-transitory computer-readable medium storing code for wireless communication at a UE is described. The code may include instructions executable to receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmit, on one or more uplink control channels, the first acknowledgement information and the second acknowledgement information.

In some examples of the method, apparatuses, and non-transitory computer-readable medium described herein, receiving the DCI message may include operations, features, means, or instructions for receiving the DCI message over a set of downlink control channel occasions.

In some examples of the method, apparatuses, and non-transitory computer-readable medium described herein, the received DCI message may be associated with a first set of downlink control channel occasions associated with the first transmission and a second set of downlink control channel occasions associated with the second transmission.

In some examples of the method, apparatuses, and non-transitory computer-readable medium described herein, the first set of downlink control channel occasions may be different than the second set of downlink control channel occasions.

In some examples of the method, apparatuses, and non-transitory computer-readable medium described herein, the first slot may be different than the second slot.

Some examples of the method, apparatuses, and non-transitory computer-readable medium described herein may further include operations, features, means, or instructions for identifying a set of indicators in the received DCI message, and determining a count associated with a transmission of the first acknowledgement information and the second acknowledgement information.

In some examples of the method, apparatuses, and non-transitory computer-readable medium described herein, the set of indicators includes at least two downlink assignment indicators.

Some examples of the method, apparatuses, and non-transitory computer-readable medium described herein may further include operations, features, means, or instructions for determining a number of DCI messages, including the received DCI message, scheduling multiple downlink data channels, each DCI message associated with the number of DCI messages corresponding to a control format, where the control format schedules at least two transmissions and includes at least two timing offset indicators, the at least two transmissions including the first transmission and the second transmission, and the at least two timing offset indicators including the first timing offset indicator and the second timing offset indicator, assigning a count to the received DCI message based on the control format of the received DCI message, and determining a power level for transmission of the one or more uplink control channels based on the determined number of DCI messages or the assigned count to the received DCI message, or both.

Some examples of the method, apparatuses, and non-transitory computer-readable medium described herein may further include operations, features, means, or instructions for identifying, in the received DCI message, a same slot for a transmission, the transmission including transmitting, on at least one uplink control channel of the one or more uplink control channels, the first acknowledgement information and the second acknowledgement information, where assigning the count to the received DCI message may be based on identifying, in the received DCI message, the same slot for the transmission.

Some examples of the method, apparatuses, and non-transitory computer-readable medium described herein may further include operations, features, means, or instructions for identifying, in the received DCI message, different slots for two or more transmissions, the two or more transmissions including transmitting, on at least two uplink control channels, the first acknowledgement information and the second acknowledgement information, where assigning the count to the received DCI message may be based on identifying, in the received DCI message, the different slots for the transmission.

In some examples of the method, apparatuses, and non-transitory computer-readable medium described herein, each DCI message associated with the number of DCI messages, including the received DCI message, includes at least two downlink assignment indicators fields, where assigning the count to the received DCI message may be based on at least two downlink assignment indicator fields.

A method of wireless communication at a base station is described. The method may include transmitting a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, and receiving, on one or more uplink control channels, the first acknowledgement information and the second acknowledgement information.

An apparatus for wireless communication is described. The apparatus may include a processor, memory in electronic communication with the processor, and instructions stored in the memory. The instructions may be executable by the processor to transmit a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, and receive, on one or more uplink control channels, the first acknowledgement information and the second acknowledgement information.

Another apparatus for wireless communication is described. The apparatus may include means for transmitting a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, and receiving, on one or more uplink control channels, the first acknowledgement information and the second acknowledgement information.

A non-transitory computer-readable medium storing code for wireless communication at a base station is described. The code may include instructions executable to transmit a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, and receive, on one or more uplink control channels, the first acknowledgement information and the second acknowledgement information.

In some examples of the method, apparatuses, and non-transitory computer-readable medium described herein, transmitting the DCI message may include operations, features, means, or instructions for transmitting the DCI message over a set of downlink control channel occasions.

In some examples of the method, apparatuses, and non-transitory computer-readable medium described herein, the transmitted DCI message may be associated with a first set of downlink control channel occasions associated with the first transmission and a second set of downlink control channel occasions associated with the second transmission.

In some examples of the method, apparatuses, and non-transitory computer-readable medium described herein, the first set of downlink control channel occasions may be different than the second set of downlink control channel occasions.

In some examples of the method, apparatuses, and non-transitory computer-readable medium described herein, the first slot may be different than the second slot.

A method of wireless communication at a UE is described. The method may include receiving a set of DCI messages scheduling a set of downlink data channel transmissions, each DCI message of the set of DCI messages identifying a same slot for transmission, on an uplink control channel, of feedback information responsive to the set of downlink data channel transmissions, identifying a set of indicators in the received set of DCI messages, each indicator of the set of indicators identifying uplink resources of the uplink control channel, at least one DCI message of the set of DCI messages including at least two indicators identifying the uplink resources of the uplink control channel, selecting, based on an ordering rule, an indicator from the set of indicators, and transmitting, on the uplink resource of the uplink control channel identified by the selected indicator, the feedback information responsive to the set of downlink data channel transmissions.

An apparatus for wireless communication is described. The apparatus may include a processor, memory in electronic communication with the processor, and instructions stored in the memory. The instructions may be executable by the processor to receive a set of DCI messages scheduling a set of downlink data channel transmissions, each DCI message of the set of DCI messages identifying a same slot for transmission, on an uplink control channel, of feedback information responsive to the set of downlink data channel transmissions, identify a set of indicators in the received set of DCI messages, each indicator of the set of indicators identifying uplink resources of the uplink control channel, at least one DCI message of the set of DCI messages including at least two indicators identifying the uplink resources of the uplink control channel, select, based on an ordering rule, an indicator from the set of indicators, and transmit, on the uplink resource of the uplink control channel identified by the selected indicator, the feedback information responsive to the set of downlink data channel transmissions.

Another apparatus for wireless communication is described. The apparatus may include means for receiving a set of DCI messages scheduling a set of downlink data channel transmissions, each DCI message of the set of DCI messages identifying a same slot for transmission, on an uplink control channel, of feedback information responsive to the set of downlink data channel transmissions, identifying a set of indicators in the received set of DCI messages, each indicator of the set of indicators identifying uplink resources of the uplink control channel, at least one DCI message of the set of DCI messages including at least two indicators identifying the uplink resources of the uplink control channel, selecting, based on an ordering rule, an indicator from the set of indicators, and transmitting, on the uplink resource of the uplink control channel identified by the selected indicator, the feedback information responsive to the set of downlink data channel transmissions.

A non-transitory computer-readable medium storing code for wireless communication at a UE is described. The code may include instructions executable to receive a set of DCI messages scheduling a set of downlink data channel transmissions, each DCI message of the set of DCI messages identifying a same slot for transmission, on an uplink control channel, of feedback information responsive to the set of downlink data channel transmissions, identify a set of indicators in the received set of DCI messages, each indicator of the set of indicators identifying uplink resources of the uplink control channel, at least one DCI message of the set of DCI messages including at least two indicators identifying the uplink resources of the uplink control channel, select, based on an ordering rule, an indicator from the set of indicators, and transmit, on the uplink resource of the uplink control channel identified by the selected indicator, the feedback information responsive to the set of downlink data channel transmissions.

Some examples of the method, apparatuses, and non-transitory computer-readable medium described herein may further include operations, features, means, or instructions for ordering the set of indicators in the received set of DCI messages based on a component carrier index of each indicator of the set of indicators.

In some examples of the method, apparatuses, and non-transitory computer-readable medium described herein, the set of DCI messages correspond to a same downlink control channel occasion, and ordering the set of indicators in the received set of DCI messages may be based on the set of DCI messages corresponding to the same downlink control channel occasion.

In some examples of the method, apparatuses, and non-transitory computer-readable medium described herein, the set of DCI messages correspond to different downlink control channel occasions, and ordering the set of indicators in the received set of DCI messages may be based on the set of DCI messages corresponding to different downlink control channel occasions.

In some examples of the method, apparatuses, and non-transitory computer-readable medium described herein, the set of indicators includes uplink control channel resource indicators.

In some examples of the method, apparatuses, and non-transitory computer-readable medium described herein, each indicator of the set of indicators may be associated with a slot indicator.

A method of wireless communication at a base station is described. The method may include transmitting a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages includes at least two indicators identifying an uplink resource of the uplink control channel, and receiving, on the uplink resource of the uplink control channel identified by a selected indicator of a set of indicators, the feedback information responsive to the set of downlink data channel transmission.

An apparatus for wireless communication is described. The apparatus may include a processor, memory in electronic communication with the processor, and instructions stored in the memory. The instructions may be executable by the processor to transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages includes at least two indicators identifying an uplink resource of the uplink control channel, and receive, on the uplink resource of the uplink control channel identified by a selected indicator of a set of indicators, the feedback information responsive to the set of downlink data channel transmission.

Another apparatus for wireless communication is described. The apparatus may include means for transmitting a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages includes at least two indicators identifying an uplink resource of the uplink control channel, and receiving, on the uplink resource of the uplink control channel identified by a selected indicator of a set of indicators, the feedback information responsive to the set of downlink data channel transmission.

A non-transitory computer-readable medium storing code for wireless communication at a base station is described. The code may include instructions executable to transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages includes at least two indicators identifying an uplink resource of the uplink control channel, and receive, on the uplink resource of the uplink control channel identified by a selected indicator of a set of indicators, the feedback information responsive to the set of downlink data channel transmission.

In some examples of the method, apparatuses, and non-transitory computer-readable medium described herein, the set of DCI messages correspond to a same downlink control channel occasion.

In some examples of the method, apparatuses, and non-transitory computer-readable medium described herein, the set of DCI messages correspond to different downlink control channel occasions.

In some examples of the method, apparatuses, and non-transitory computer-readable medium described herein, the set of indicators includes uplink control channel resource indicators.

In some examples of the method, apparatuses, and non-transitory computer-readable medium described herein, each indicator of the set of indicators may be associated with a slot indicator.

DETAILED DESCRIPTION

Figure 1:
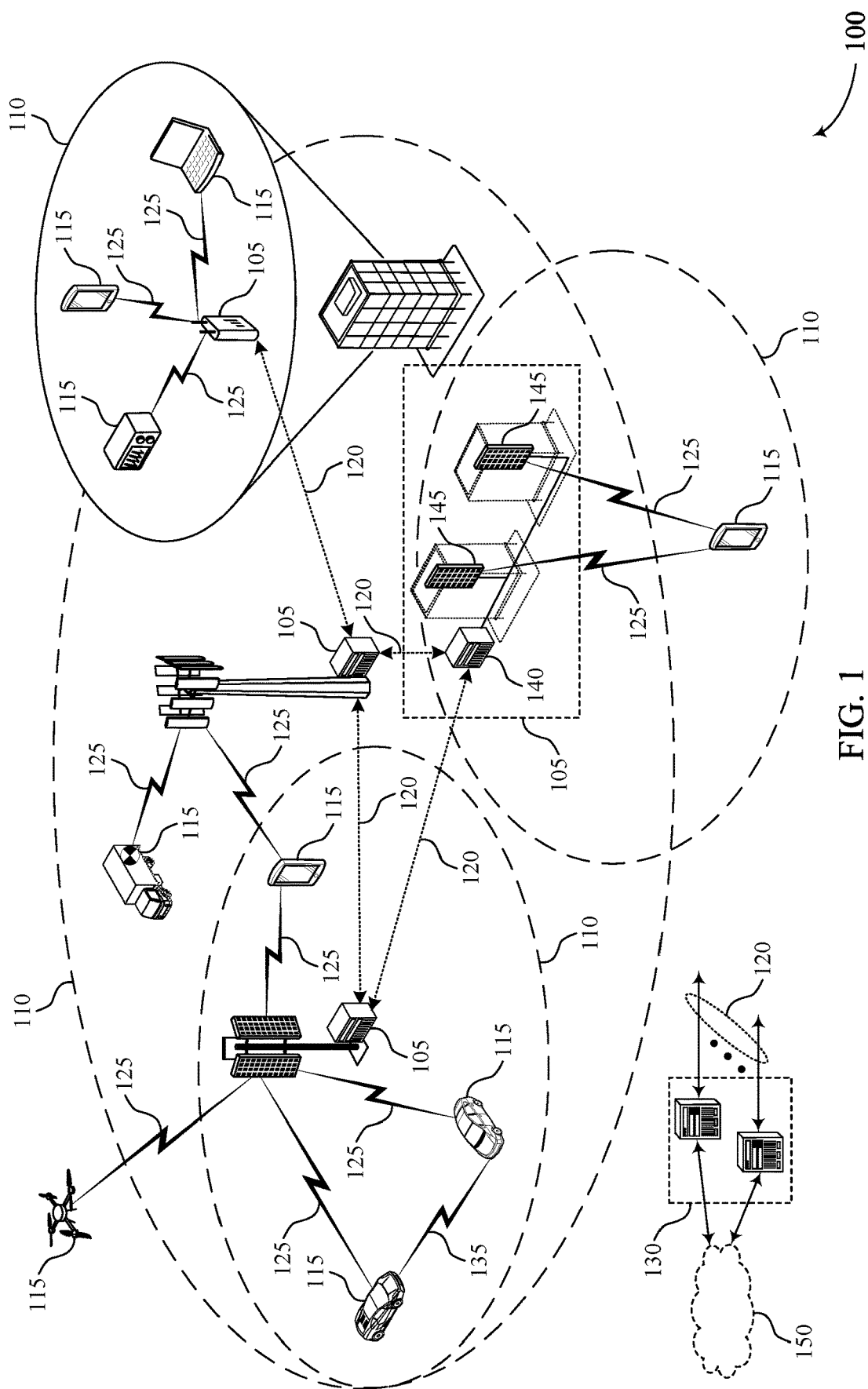
FIGS. 1 and 2 illustrates examples of wireless communication systems that support acknowledgement feedback for multi-component carrier scheduling with separate feedback-related control fields in accordance with aspects of the present disclosure.

Wireless communications systems may include multiple communication devices such as user equipment (UEs) and base stations, where the base stations may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support hybrid automatic repeat request (HARQ) feedback for multiple physical channels (e.g., multiple physical downlink shared channels (PDSCH)). In some examples, the described techniques may be used to configure the UEs to support HARQ feedback for multiple PDSCHs scheduled via cross component carrier (or cross-carrier) scheduling to improve reliability of various types of communication (e.g., data communication).

A base station may schedule multiple downlink data channels for a UE by transmitting control information over a downlink control channel. A downlink data channel may include a PDSCH, while a downlink control channel may include a physical downlink control channel (PDCCH). The base station may schedule multiple PDSCH for the UE by transmitting downlink control information (DCI) over the PDCCH. Each PDSCH of the multiple PDSCH may carry a number of downlink data channel transmissions. In some examples (e.g., when performing joint scheduling), the DCI may schedule a first PDSCH of a first component carrier and a second PDSCH of a second component carrier. The UE may receive and attempt to decode the first PDSCH and the second PDSCH, respectively.

In some examples, based on successfully, or unsuccessfully, decoding the first PDSCH and the second PDSCH, the UE may transmit feedback (e.g., a HARQ feedback) respectively associated with the first PDSCH and the second PDSCH. The feedback may be an acknowledgement (ACK) or a non-acknowledgement (NACK) of the receipt of the scheduled PDSCH and may include information associated with an ability of the UE to respectively decode the first PDSCH and the second PDSCH. For each of the first PDSCH and the second PDSCH, the UE may transmit either an ACK (e.g., in the case that the UE successfully receives the data transmission) or a NACK (e.g., in the case that the UE unsuccessfully receives the data transmission). In some examples, the UE may transmit the feedback to the base station in one or more uplink control channels (or one or more resources associated with an uplink control channel), such as a physical uplink control channel (PUCCH).

The UE may determine a resource allocation for a PUCCH and one or more parameters for the feedback transmission based on a number of control fields or indicators included in the DCI. For instance, the UE may determine the resource allocation for the PUCCH based on one or more of a $K_1$ field, a PUCCH resource indicator (PRI) field, or a downlink assignment indicator (DAI) field. Additionally or alternatively, the UE may determine one or more parameters for feedback transmissions based on a transmit power control (TPC) field in the DCI. In some examples, the UE may use a first resource allocation (e.g., a first PUCCH resource, such as a first slot of the PUCCH or a first transmission time interval (TTI) of the PUCCH) for feedback transmissions associated with the first PDSCH and a second resource allocation (e.g., a second PUCCH resource, such as a second slot of the PUCCH or a second TTI of the PUCCH) for feedback transmissions associated with the second PDSCH. For example, the base station may include a first set of indicators in the DCI that indicate the first resource allocation for the UE to use for feedback transmissions associated with the first PDSCH and a second set of indicators in the DCI that indicate the second resource allocation for the UE to use for feedback transmissions associated with the second PDSCH. The UE may thus increase coverage for wireless communications by supporting HARQ feedback for multiple PDSCH scheduled via cross component carrier scheduling.

Some aspects of the subject matter described in this disclosure may be implemented to realize one or more of the following potential advantages, among others. The techniques employed by the UE may provide benefits and enhancements to the operation of the UE. For example, configuring the UE to support HARQ feedback for multiple PDSCH scheduled via cross-carrier scheduling, among other examples, may support decreased power consumption and resource usage, and may support increased communication coverage, spectral efficiency, data rates, and communication capacity, among other benefits. Further, configuring a wireless communications system to support DCI with a set of feedback-related DCI fields for each scheduled PDSCH may support greater system flexibility such that the base station may spread PUCCH transmissions over a number of slots, which may reduce interference.

Aspects of the disclosure are initially described in the context of wireless communications systems. Aspects of the disclosure are further illustrated by and described with reference to a block diagram and process flows that relate to HARQ feedback for multi-component carrier scheduling. Aspects of the disclosure are further illustrated by and described with reference to apparatus diagrams, system diagrams, and flowcharts that relate to providing HARQ feedback for multi-component carrier scheduling.

FIG. 1 illustrates an example of a wireless communications system 100 that supports acknowledgement feedback for multi-component carrier scheduling with separate feedback-related control fields in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

A base station 105 may transmit a DCI in a PDCCH to a UE 115 to schedule multiple physical channels (e.g., multiple PDSCHs) between the base station 105 and the UE 115. In some examples, the base station 105 may schedule the multiple physical channels over multiple component carriers. For example, the base station 105 may schedule the multiple physical channels on multiple cells, where each cell is associated with a component carrier. Accordingly, the UE 115 may receive the DCI and monitor the multiple component carriers for the multiple scheduled physical channels. In some examples, the UE 115 may transmit feedback information (e.g., HARQ feedback) to the base station 105 based on receiving and decoding each of the multiple physical channels. In some examples, the UE 115 may use resources associated with an uplink control channel (e.g., PUCCH resources) for the feedback transmissions and may determine which PUCCH resources to use for the feedback transmissions based on the DCI received from the base station 105.

The UE 115 may use different PUCCH resources for feedback transmissions associated with the multiple physical channels received over the multiple component carriers. A PUCCH resource may be one or more symbols, minislots, slots, subframes, or frames. In some examples, the UE 115 may use a first resource allocation (e.g., a first PUCCH resource, such as a first slot) for feedback transmissions associated with a first physical channel (e.g., a first PDSCH) received over a first component carrier and may use a second resource allocation (e.g., a second PUCCH resource, such as a second slot) for feedback transmissions associated with a second physical channel (e.g., a second PDSCH) received over a second component carrier based on two sets of control fields (e.g., DCI fields) in the DCI. In such examples, the DCI may belong to a first set of control channel monitoring occasions (e.g., PDCCH monitoring occasions) associated with the first resource allocation and a second set of control channel monitoring occasions associated with the second resource allocation. As such, the UE 115 may receive the DCI during the first set of control channel monitoring occasions and the second control channel monitoring occasion, and may identify a first set of DCI fields (e.g., indicators) during the first set of control channel monitoring occasions and may identify a second set of DCI fields during the second set of control channel monitoring occasions.

The UE 115 may use the first set of DCI fields to determine the first resource allocation and may use the second set of DCI fields to determine the second resource allocation. In some other examples, the UE 115 may use the same PUCCH resource (e.g., the same slot) for feedback transmissions associated with the multiple physical channels received over the multiple component carriers. For example, the UE 115 may use the same PUCCH resource for feedback transmissions associated with the first physical channel (e.g., the first PDSCH) and the second physical channel (e.g., the second PDSCH). In such examples, the DCI may belong to a single set of monitoring occasions. In some aspects, the UE 115 identify a last PRI field in the DCI and may determine the PUCCH resource based on the last PRI field.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
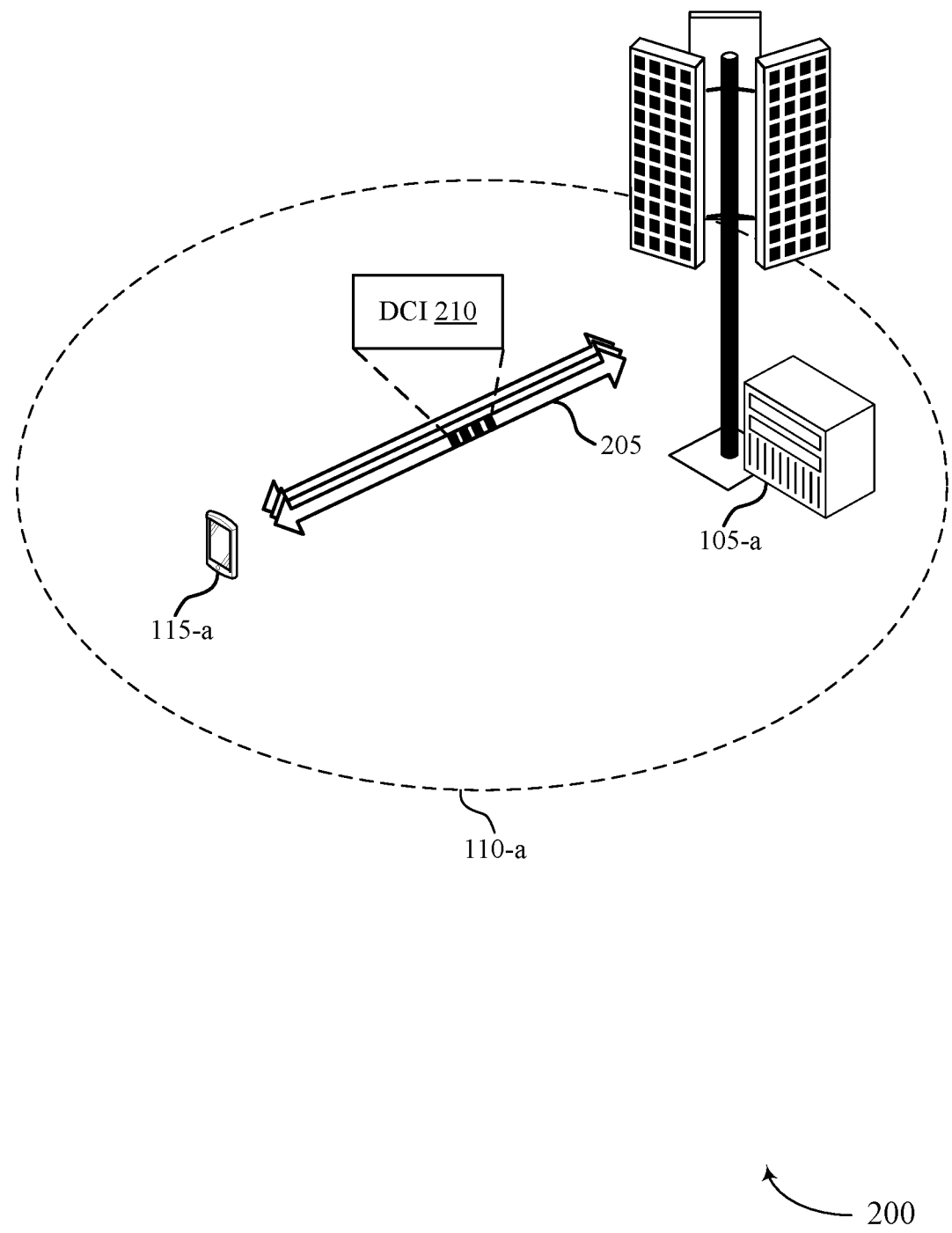

FIG. 2 illustrates an example of a wireless communications system 200 that supports acknowledgement feedback for multi-component carrier scheduling with separate feedback-related control fields in accordance with aspects of the present disclosure. In some examples, the wireless communications system 200 may implement aspects of the wireless communications system 100. For example, the wireless communications system 200 may include a UE 115-*a* and a base station 105-*a* within a geographic coverage area 110-*a*. The base station 105-*a* and the UE 115-*a* may be examples of the corresponding devices described with reference to FIG. 1. In some examples, the wireless communications system 200 may support multiple radio access technologies including 4G systems, such as LTE systems, LTE-A systems, or LTE-A Pro systems, and 5G systems, which may be referred to as NR systems. In some examples, the wireless communications system 200 may be configured to support joint scheduling of multiple physical channels over multiple component carriers. The wireless communications system 200 may also support decreased power consumption at UE 115-*a* and, in some examples, may support increased communication quality for high reliability and low latency wireless communication operations, among other benefits.

The base station 105-*a* and the UE 115-*a* may be configured with multiple antennas, which may be used to employ techniques such as transmit diversity, receive diversity, MIMO communications, or beamforming, or any combination thereof. The antennas of the base station 105-*a* and the UE 115-*a* may be located within one or more antenna arrays or antenna panels, which may support MIMO operations, or transmit or receive beamforming. For example, the base station 105 antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming of communications with the UE 115-*a*. Likewise, the UE 115-*a* may have one or more antenna arrays that may support various MIMO or beamforming operations. Additionally or alternatively, an antenna panel may support radio frequency beamforming for a signal transmitted via one or more antenna ports. The base station 105-*a* and the UE 115-*a* may thus be configured to support directional communications 205 using the multiple antennas.

In some examples, the base station 105-*a* and the UE 115-*a* may communicate via the directional communications 205 using multiple component carriers. For example, the base station 105-*a* and the UE 115-*a* may be configured to support multiple downlink component carriers and/or multiple uplink component carriers. A component carrier may be associated with a carrier bandwidth of a radio frequency spectrum and, in some examples, the carrier bandwidth may be referred to as a system bandwidth of the carrier or the wireless communications system 200. For example, the carrier bandwidth may be one of a number of determined bandwidths for carriers of a particular radio access technology (e.g., 1.4, 3, 5, 10, 15, 20, 40, or 80 MHz). The base station 105-*a* and the UE 115-*b* may be configured to support the directional communications 205 over a carrier bandwidth or may be configured to support the directional communications 205 over one of multiple carrier bandwidths. In some examples, the base station 105-*a* or the UE 115-*a* may support simultaneous communications via carriers associated with multiple carrier bandwidths.

The UE 115-*a*, in the wireless communications system 200, may support operations to preserve resources (for example, time and frequency resources of the wireless communications system 200) or a battery life of the UE 115-*a*, among other examples. In some examples, the UE 115-*a* may be configured to support operations to manage or improve (e.g., increase a communication quality of) the directional communications 205 between the base station 105-*a* and the UE 115-*a*. For example, the base station 105-*a* may configure the UE 115-*a* to support cross component carrier scheduling for some physical channels, such as PDSCH, to increase efficiency and reliability of the directional communications 205.

The base station 105-*a* may transmit, and the UE 115-*a* may receive, control information, for example, such aa DCI 210 that may schedule physical channels (e.g., PDSCH) across multiple component carriers. In some examples, the base station 105-*a* and the UE 115-*a* may support cross component carrier scheduling to balance a load (e.g., traffic) and scheduling across different component carriers associated with the UE 115-*a*. By supporting cross component carrier scheduling, the UE 115-*a* may receive a physical channel (e.g., PDSCH) on a second component carrier other than, or in addition to, a first component carrier on which another physical channel (e.g., PDCCH) carrying the control information was received.

In some examples, the base station 105-*a*, in order to schedule the multiple physical channels between the base station 105-*a* and the UE 115-*a*, may transmit multiple DCIs 210 to the UE 115-*a*. For example, the base station 105-*a* may transmit a separate DCI 210 to the UE 115-*a* for each of the multiple physical channels. For instance, in cases when the base station 105-*a* schedules a first physical channel on a first component carrier and a second physical channel on a second component carrier, the base station 105-*a* may transmit a first DCI 210 to schedule the first physical channel and to provide a resource allocation (e.g., a PUCCH resource) for the UE 115-*a* to use for feedback transmissions associated with the first physical channel. Similarly, the base station 105-*a* may transmit a second DCI 210 to schedule the second physical channel and to provide a resource allocation (e.g., a PUCCH resource) for the UE 115-*a* to use for feedback transmissions associated with the second physical channel.

In such cases, the UE 115-*a* may receive the first DCI 210 and the second DCI 210 and determine where (e.g., in which resources of the component carriers) to receive the first physical channel and the second physical channel. The UE 115-*a* may additionally determine the PUCCH resources that the UE 115-*a* may use for feedback transmissions respectively associated with the first physical channel and the second physical channel based on receiving the first DCI 210 and the second DCI 210, respectively. In some examples, however, transmitting multiple DCI 210 may result in a larger signaling overhead and more processing operations at the base station 105-*a* and the UE 115-*a*. For example, in the case that the UE 115-*a* receives multiple DCI 210, the UE 115-*a* may decode and perform an error check, such as a cyclic redundancy check (CRC), for each DCI 210 that the UE 115-*a* receives, which may increase a number of processing operations that the UE 115-*a* performs.

In some examples, the base station 105-*a* may jointly schedule multiple physical channels (e.g., the first physical channel and the second physical channel) between the base station 105-*a* and a UE 115-*a* over multiple component carriers with a reduced number of DCI 210 (e.g., a single DCI 210). For example, the base station 105-*a* may transmit a DCI 210 to the UE 115-*a* to schedule the first physical channel and the second physical channel. In some examples, the DCI 210 may additionally indicate one or more PUCCH resources for the UE 115-*a* to use for feedback transmissions respectively associated with the first physical channel and the second physical channel.

In some aspects, the wireless communications system 200 may be configured such that the UE 115-*a* may use a same PUCCH resource for feedback transmissions associated with both of the first physical channel and the second physical channel. In such examples, the DCI 210 may include a set of indicators (e.g., a $K_1$ field, a PRI field, a TPC field, a DAI field, or any combination thereof) that the UE 115-*a* may use to determine the PUCCH resource to use for feedback transmissions. In some examples, a number of fields of the DCI 210 may include at most one of each field type, which may enable the UE 115-*a* to unambiguously determine the PUCCH resource to use for feedback transmissions. However, this implementation may be associated with a lower system flexibility, because the base station 105-*a* may be unable to indicate more than a single PUCCH (e.g., a single PUCCH resource) for the UE 115-*a* to use for feedback transmissions.

To enable greater system flexibility, the wireless communication system 200 may be configured such that the UE 115-*a* may use different PUCCH resources for feedback transmissions respectively associated with first physical channel and the second physical channel. As such, the DCI 210 may include a first set of indicators associated with a first PUCCH resource for feedback associated with the first physical channel and a second set of indicators associated with a second PUCCH resource for feedback associated with the second physical channel. In some examples, the first set of indicators and the second set of indicators may include similar (or the same) field types. For example, the first set of indicators and the second set of indicators may both include a respective $K_1$ field, PRI field, TPC field, DAI field, or any combination thereof. In some examples, a $K_1$ field may be a PDSCH-to-HARQ_feedback timing indicator, which may indicate a number of slots between a received PDSCH and a corresponding feedback transmission. The PRI field may indicate the resources (e.g., the frequency resources) that the UE 115-*a* may use for PUCCH. The UE 115-*a* may use the TPC field for power control operations. In some examples, the DAI field may be a counter DAI field (the two terms may be used interchangeably) and the UE 115-*a* may use the DAI field to assign a count to a received DCI based on a scheduled slot for a corresponding feedback transmission.

In some examples, the first set of indicators may be separate from the second set of indicators, such that each field type may appear twice in the DCI. For example, in the context of the $K_1$ field, a first $K_1$ field may belong to the first set of indicators and a second $K_1$ field may belong to the second set of indicators, where the first $K_1$ field and the second $K_1$ field may represent two separate fields within the DCI 210. The DCI 210 may similarly include a first PRI field and a second PRI field, a first TPC field and a second TPC field, a first DAI field and a second DAI field, or any combination thereof. In some aspects, the number of the same field types that the DCI 210 includes may be proportional to the number of physical channels that the base station 105-*a* schedules using the DCI 210.

In some examples, the base station 105-*a* may have greater flexibility in jointly scheduling multiple transmissions based on using a respective set of indicators for each physical channel between the base station 105-*a* and the UE 115-*a*. Further, in some examples, a single DCI 210 including a respective set of indicators for each scheduled physical channel may be smaller (e.g., may be shorter or include a smaller amount of information) than a combination of DCI 210 that schedule a single transmission. Additionally or alternatively, the base station 105-*a* may be able to more efficiently compact (e.g., include) information within the single DCI 210 (e.g., may include a higher amount of usable information within the single DCI 210). Examples of cross-carrier, joint scheduling for multiple physical channels are described in more detail with reference to FIG. 3.

Figure 3:
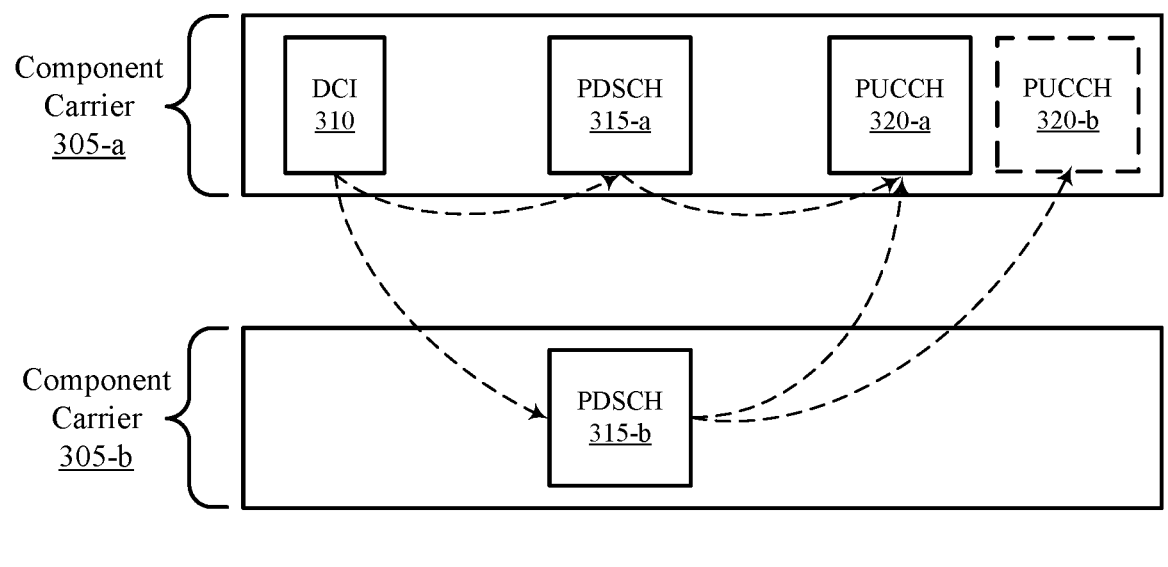
FIG. 3 illustrates an example of a block diagram that supports acknowledgement feedback for multi-component carrier scheduling with separate feedback-related control fields in accordance with aspects of the present disclosure.
Figure 3:
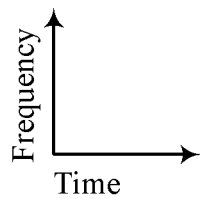

FIG. 3 illustrates an example of a block diagram 300 that supports acknowledgement feedback for multi-component carrier scheduling with separate feedback-related control fields in accordance with aspects of the present disclosure. The block diagram 300 may implement aspects of the wireless communications systems 100 and 200 described with reference to FIGS. 1 and 2, respectively. For example, the block diagram 300 may be based on a configuration indicated by a base station 105, and implemented by a UE 115. In the example illustrated in FIG. 3, the block diagram 300 may be applicable to implementations or instances where the UE 115 is configured to support NR dynamic spectrum sharing (DSS). Additionally, in the example illustrated in FIG. 3, the block diagram 300 may be applicable to implementations or instances where the UE 115 is configured to provide HARQ feedback (e.g., a HARQ-ACK or a HARQ-NACK) for multiple physical channels (e.g., multiple PDSCHs) scheduled with cross-carrier scheduling.

For example, a UE 115 may communicate with a base station 105 over multiple component carriers 305. The component carriers 305 may correspond to a system bandwidth, which may be associated with time resources (e.g., a symbol, a minislot, a slot, a subframe, a frame) as well as frequency resources (e.g., subcarriers, carriers). In some examples, the UE 115 may communicate with a primary cell, a primary scheduling cell, or a secondary cell using a component carrier 305-*a* or a component carrier 305-*b*, or both. Examples of a primary cell, a primary scheduling cell, or a secondary cell may be examples of a base station 105 (e.g., or portions thereof), as described with reference to FIGS. 1 and 2.

In the example of FIG. 3, a UE 115 may receive, from a base station 105, a DCI 310 on the component carrier 305-*a*. For example, the UE 115 may receive a PDCCH carrying the DCI 310 on the component carrier 305-*a*. The PDCCH may, in some examples, be associated with a secondary cell scheduling PDSCH or physical uplink shared channel (PUSCH) on a primary cell or a primary scheduling cell. The DCI 310 may schedule both a PDSCH 315-*a* associated with the component carrier 305-*a* and a PDSCH 315-*b* associated with the component carrier 305-*b*. In some other examples, the PDCCH may be associated with a primary cell, a primary scheduling cell, or a secondary cell and the base station 105 may schedule PDSCH or PUSCH on multiple cells (e.g., multiple component carriers 305) using a single DCI 310. In some examples, a number of cells (e.g., a number of component carriers 305) may be preconfigured (e.g., two cells).

In some examples, in addition to scheduling the PDSCH 315-*a* associated with the component carrier 305-*a* and the PDSCH 315-*b* associated with the component carrier 305-*b*, the DCI 310 may schedule a PUCCH 320, which may be an example of one or more PUCCH resources as described with reference to FIGS. 1 and 2. The UE 115 may be configured to provide feedback information (e.g., HARQ feedback, such as a HARQ-ACK or a HARQ-NACK) for the PDSCH 315-*a* or the PDSCH 315-*b*, or both, via the PUCCH 320 (e.g., a PUCCH 320-*a*). In some examples, the PUCCH 320-*a* may be associated with the same component carrier 305-*a* as the DCI 310.

In some examples, the PUCCH 320-a may correspond to a PUCCH resource. A PUCCH resource configured for each PUCCH resource identifier may be related to a starting resource block, a PUCCH format, a number of OFDM symbols and a starting OFDM symbol (all within one slot), a cyclic shift, etc.

In some other examples, the DCI 310 may schedule more than one PUCCH 320. For example, the DCI 310 may schedule two PUCCHs 320 in the case that the DCI 310 schedules two PDSCHs 315. In such examples, a first PUCCH 320-a may be referred to as the first PUCCH resource and a second PUCCH 320-b may be referred to as the second PUCCH resource. In some aspects, the first PUCCH resource may be associated with a first slot and the second PUCCH resource may be associated with a second slot. Accordingly, the UE 115 may use the first PUCCH 320-a for feedback transmissions associated with the PDSCH 315-a and may use the second PUCCH 320-b for feedback transmissions associated with the PDSCH 315-b.

In some examples, if a same PUCCH resource identifier is used in different slots (e.g., due to different $K_1$ fields as described herein), corresponding PUCCHs 320 (e.g., different PUCCH transmissions) may be different and may be considered to be a different PUCCH 320. For example, according to the techniques described herein, the UE 115 may use the first PUCCH 320-a (e.g., during the first slot) for feedback transmissions associated with the PDSCH 315-a and may use the second PUCCH 320-b (e.g., during the second slot) for feedback transmissions associated with the PDSCH 315-b. In some cases, the first portion of the PUCCH 320-a and the second portion of the PUCCH 320-a may be the same portion (e.g., may correspond to the same slot).

Thus, a base station 105 may transmit, to the UE 115, a DCI 310 that jointly schedules multiple PDSCH 315 across multiple component carriers 305 as well as one or more PUCCH 320 (e.g., PUCCH 320-a or PUCCH 320-a and 320-b) for the UE 115 to provide feedback for the jointly scheduled PDSCH 315 on at least one component carrier 305 of the multiple component carriers 305. In some examples, the UE 115 may determine the PUCCH 320 (and PUCCH resources associated with the PUCCH 320) based on identifying a number of fields in the DCI 310. As described herein, to support system flexibility the DCI 310 may include a first set of indicators to indicate the first PUCCH resource for feedback transmissions associated with the PDSCH 315-a and a second set of indicators to indicate the second PUCCH resource for feedback transmissions associated with the PDSCH 315-b.

Returning to FIG. 2, in some wireless communications systems, the UE 115-a may be spend a higher amount of time to determine which DCI fields are associated with the first PUCCH resource and which DCI fields are associated with the second PUCCH resource. Accordingly, in some examples, base station 105-a and the UE 115-a may share one or more mutually understood rules to enable the base station 105-a and the UE 115-a to identify which feedback-related DCI fields are associated with which PUCCH resource. In some aspects, the one or more rules may apply in different scenarios, such that if the base station 105-a and the UE 115-a identify a scenario, the base station 105-a and the UE 115-a may determine to use a rule that applies for the identified scenario. A first scenario may be when the base station 105-a schedules multiple physical channels and schedules multiple different PUCCH resources that the UE 115-a may use for feedback transmissions respectively associated with each of the multiple physical channels. A second scenario may be when the base station 105-a schedules multiple physical channels and schedules a single PUCCH resource that the UE may use for feedback transmissions associated with each of the multiple physical channels.

In some examples of the first scenario, the UE 115-a may receive the DCI 210 and identify that the DCI 210 schedules a first physical channel for a first component carrier and a second physical channel for a second component carrier. The DCI 210 may also indicate that the UE 115-a may use a first PUCCH resource for feedback transmissions associated with the first physical channel and a second PUCCH resource for feedback transmissions associated with the second physical channel, where the first PUCCH resource is different (e.g., in a different slot) than the second PUCCH resource. For example, the DCI 210 may include a first $K_1$ field and a second $K_1$ field that indicate two different slots for the first PUCCH resource and the second PUCCH resource, respectively.

In some examples, the UE 115-a may be configured with a type 2 (or dynamic) HARQ-ACK codebook and may generate the HARQ-ACK codebook based on a set of PDCCH monitoring occasions (e.g., a set of downlink control channel occasions associated with receiving the DCI 210). For example, the UE 115-a may generate a HARQ-ACK codebook based on control information (e.g., DCI fields) received during the set of monitoring occasions and may use the codebook to determine a payload of the PUCCH resource or one or more other feedback parameters that the UE 115-a may use for feedback transmissions.

In some examples, the UE 115-a may use one set of monitoring occasions to determine a codebook, such that the one set of monitoring occasions may correspond to DCI fields associated with a same slot for the PUCCH transmission. For example, the UE 115-a may be unable to accurately determine a slot for the PUCCH transmission if UE 115-a uses a set of monitoring occasions associated with a number of DCI fields associated with the first PUCCH transmission and a number of DCI fields associated with the second PUCCH transmission in the same HARQ-ACK codebook generation procedure. For instance, using one field from the first number of fields and one field from the second number of fields in the same HARQ-ACK codebook generation procedure may not be supported by the UE 115-a because the two fields may indicate different slots for the PUCCH transmission.

As such, in the first scenario where the DCI 210 may include a first set of indicators that indicate a first PUCCH transmission and a second set of indicators that indicate a second PUCCH transmission different than the first PUCCH transmission, the UE 115-a and the base station 105-a may determine (or apply a mutually understood rule) that the DCI 210 is associated with two different sets of PDCCH monitoring occasions (e.g., the DCI 210 may belong to a number of PDCCH monitoring occasions equal to the number of different PUCCH transmissions that the UE 115-a may use for feedback transmissions). For example, the UE 115-a may receive the DCI 210 with two different sets of monitoring occasions, where the UE 115-a may use a first set of monitoring occasions to receive the first set of indicators in the DCI 210 that indicate the first PUCCH transmission and the UE 115-a may use a second set of monitoring occasions to receive the second set of indicators in the DCI 210 that indicate the second PUCCH transmission. In this manner, the UE 115-a may generate the HARQ-ACK codebook to determine the first PUCCH transmission and generate the HARQ-ACK codebook to determine the second PUCCH transmission separately.

In some examples, a first DAI field (e.g., included in the first set of indicators in the DCI 210) and a second DAI field (e.g., included in the second set of indicators in the DCI 210) may correspond to a first counting process and a second counting process, respectively (e.g., two different counting processes), which may be associated with the first PUCCH resource and the second PUCCH resource, respectively. For example, the UE 115-*a* may transmit feedback information associated with the first physical channel in the first PUCCH resource based on the first DAI field and may transmit feedback information associated with the second physical channel in the second PUCCH resource based on the second DAI field.

In some examples of the second scenario, the UE 115-*a* may receive the DCI 210 and identify that the DCI 210 schedules a first physical channel for a first component carrier and a second physical channel for a second component carrier. The DCI 210 may also indicate that the UE 115-*a* may use a same PUCCH transmission (e.g., a same slot) for feedback transmissions associated with the first physical channel and the second physical channel (e.g., the UE 115-*a* may transmit feedback for both the first physical channel and the second physical channel in the same PUCCH). For instance, the DCI 210 may include a first PRI field a second PRI field based on scheduling two physical channels, and each of the first PRI field and the second PRI field may be associated with separate $K_1$ fields (e.g., a first $K_1$ field and a second $K_1$ field, respectively). The first $K_1$ field and the second $K_1$ field may indicate that the feedback transmissions associated with both of the first physical channel and the second physical channel use the same PUCCH transmission (e.g., the same slot).

Among the PM fields that are associated with $K_1$ fields that indicate the same slot for feedback transmissions (e.g., the first PM field and the second PRI field), the UE 115-*a* and the base station 105-*a* may determine (or apply a mutually understood rule) that the UE 115-*a* may use the last PM field to determine the PUCCH resource. For example, the UE 115-*a* may receive the DCI 210 in a set of monitoring occasions (e.g., one set of monitoring occasions in the case that the DCI 210 schedules a single PUCCH resource) and may identify a number of PRI fields in the DCI 210, each PRI field associated with a monitoring occasion index. In some examples, a monitoring occasion with the highest monitoring occasion index may correspond to a last monitoring occasion of the set of monitoring occasions and, likewise, a monitoring occasion associated with the lowest monitoring occasion index may correspond to a first monitoring occasion of the set of monitoring occasions.

Accordingly, the UE 115-*a* may determine that one or more PRI fields may be associated with a highest monitoring occasion index of the number of PRI fields received in the DCI 210 and may determine which PRI field of the one or more PRI fields to use for PUCCH resource determination based on a component carrier index. In some examples, a PRI field associated with a first monitoring occasion may be indexed (e.g., ordered) with respect to the other PRI fields within the first monitoring occasion based on the component carrier indices of the PRI fields. For example, each PRI field in the DCI 210 may be associated with a component carrier index and the component carrier index associated with a PRI field may correspond to the component carrier on which the physical channel associated with the PRI field is transmitted. For example, a first PRI field may be associated with a first physical channel scheduled to be transmitted on a first component carrier and the first PRI field may accordingly be associated with a component carrier index of 0. Similarly, a second PRI field may be associated with a second physical channel scheduled to be transmitted on a second component carrier and may accordingly be associated with a component carrier index of 1. To determine the last PRI field, the UE 115-*a* may identify the one or more PRI fields associated with the highest monitoring occasion index and identify a PRI field of the one or more PRI fields that has the highest component carrier index.

As described in some of the examples of the first scenario, a DCI 210 that schedules two different PUCCH resources for feedback transmissions for two physical channels may be associated with two different sets of monitoring occasions. As such, a first set of PRI fields associated with a first PUCCH resource and a second set of PRI fields associated with a second PUCCH resource may similarly be associated with the two different sets of monitoring occasions and may not be ordered or indexed with respect to each other, while PM fields within the same set of monitoring occasions may be ordered with respect to each other. For example, the first set of PRI fields may be ordered with respect to each other based on belonging to the same set of monitoring occasions.

Additionally or alternatively, the UE 115-*a* may use the DCI 210 to determine one or more power control parameters associated with the feedback transmissions (e.g., the PUCCH transmissions). In some examples, the PUCCH may carry uplink control information (UCI), which may include a payload associated with the feedback transmissions (e.g., the UCI may include the feedback information). In some aspects (e.g., when the UCI payload is less than or equal to 11 bits), the UE 115-*a* may calculate a number of HARQ-ACK bits and use the calculated bits to determine a PUCCH power control formula. The calculated bits may exclude a number of dummy NACKs from the payload and may include a number of NACKs due to missing DCIs (e.g., a NACK transmission based on receiving a physical channel in the absence of a DCI associated with the physical channel), as well as a number of received transport blocks (TBs). In some examples, the number of HARQ-ACK bits may be calculated based on Equation (1):

$$n_{HARQ-ACK} = \\ n_{HARQ-ACK,TB} = \left(\left(V_{DAI,m_{last}}^{DL} - \sum_{c=0}^{N_{cells}^{DL}-1} U_{DAI,c}\right) \mod 4\right) N_{TB,max}^{DL} + \\ \sum_{c=0}^{N_{cells}^{DL}-1}\left(\sum_{m=0}^{M-1} N_{m,c}^{received} + N_{SPS,c}\right) \tag{1}$$

In some examples, $n_{HARQ-ACK}$ and $n_{HARQ-ACK,TB}$ may be the number of HARQ-ACK bits, $V_{DAI,m_{last}}^{DL}$ may be a value of the total DAI (if any) in the last PDCCH monitoring occasion or the last value of the counter associated with the DAI field in the last monitoring occasion, $V_{DAI,m_{last}}^{DL}$ may be a value of 0 if the UE 115-*a* does not detect any DCI 210 (e.g., DCI format 1_0 or DCI format 1_1) scheduling PDSCH reception or indicating a downlink semi-persistent scheduling (SPS) release for any serving cell c in any of the M monitoring occasions, $U_{DAI,c}$ may be a total number of a DCI format scheduling PDSCH receptions or indicating SPS PDSCH release that the UE 115-*a* may detect within the M PDCCH monitoring occasions for a serving cell c, $N_{TB,max}^{DL}$ may be a maximum number of downlink TBs associated with the DCI 210. The value of $N_{TB,max}^{DL}$ may be equal to 2 if the value of the higher layer parameter maxNofCodeWordsScheduledByDCI is 2 for any serving cell c and the higher layer parameter harq-ACK-Spatial-BundlingPUCCH is not provided. Otherwise, the value of $N_{TB,max}^{DL}$ may be 1.

In some examples, $N_{cells}^{DL}$ may be a number of downlink serving cells, which may be associated with a number of component carriers over which the DCI 210 schedules PDSCHs, and $N_{m,c}^{received}$ may be a number of TBs that the UE 115-a receives in a PDSCH scheduled by a DCI 210 (e.g., DCI format 1_0 or DCI format 1_1) that the UE 115-a detects in a PDCCH monitoring occasion m for a serving cell c if the higher layer parameter harq-ACK-Spatial-BundlingPUCCH is unprovided (e.g., if the UE 115-a does not identify harq-ACK-SpatialBundlingPUCCH). If the higher layer parameter harq-ACK-SpatialBundlingPUCCH is provided (e.g., if the UE identifies harq-ACK-Spatial-BundlingPUCCH), $N_{m,c}^{received}$ may be the number of PDSCH scheduled by the DCI 210 (e.g., a DCI format 1_0 and a DCI format 1_1) that the UE 115-a detects in the PDCCH occasion m for a serving cell c. Alternatively, $N_{m,c}^{received}$ may be the number of DCI 210 (e.g., DCI format 1_0) that the UE detects and indicates for SPS PDSCH release in PDCCH monitoring occasion m for a serving cell c.

In some examples, $N_{SPS,c}$ may be a number of SPS PDSCH receptions by the UE 115-a on a serving cell c for which the UE 115-a transmits corresponding feedback (e.g., HARQ-ACK information) in the same PUCCH as the UE 115-a uses for feedback corresponding to PDSCH receptions or SPS PDSCH release scheduled by the DCI 210 (e.g., DCI format 1_0) within the M PDCCH monitoring occasions.

In some examples, Equation 1 may simplify to $n_{HARQ\text{-}ACK}$=A+B, where A and B may be defined by equations (2) and (3), respectively:

$$A = \left(\left(V_{DAI,m_{last}}^{DL} - \sum_{c=0}^{N_{cells}^{DL}-1} U_{DAI,c}\right) \bmod 4\right) N_{TB,max}^{DL} \quad (2)$$

$$B = \sum_{c=0}^{N_{cells}^{DL}-1} \left(\sum_{m=0}^{M-1} N_{m,c}^{received} + N_{SPS,c}\right) \quad (3)$$

In some examples, A may be a number of bits (e.g., the number of NACK bits) that the UE 115-a may generate in a codebook (e.g., a HARQ-ACK codebook) due to missing DCIs, B may be a number of bits (e.g., the number of ACK and NACK bits) that the UE 115-a may generate in the codebook based on the results of decoding the physical channels (e.g., the PDSCHs) received from the base station 105-a, $U_{DAI,c}$ may be a total number of a DCI format (e.g., a DCI format 1_0, a DCI format 1_1) scheduling PDSCH receptions or indicating SPS PDSCH release that the UE 115-a may detect within the M monitoring occasions for a serving cell c, where a detected DCI format that schedules multiple (e.g., two) physical channels (e.g., PDSCHs) and includes multiple timing indicator fields (e.g., PDSCH-to-HARQ_feedback timing indicator fields, or $K_1$ fields) that indicate the same PUCCH resource (e.g., the same slot for feedback transmission or PUCCH transmission) is counted based on the number of scheduled physical channels (e.g., is counted two times when scheduling two PDSCHs). Otherwise, the detected DCI format may be counted once. For example, the detected DCI format may be counted once when the DCI format schedules one physical channel (e.g., one PDSCH) or schedules two physical channels but with different PUCCH resources (e.g., different slots for corresponding feedback transmissions or PUCCH transmissions). Alternatively, $U_{DAI,c}$ may be the total number of counter DAI fields in detected DCIs 210 within the M monitoring occasions that are associated with the same PUCCH transmission (e.g., the same HARQ-ACK transmission or the same slot for PUCCH transmission).

Figure 4:
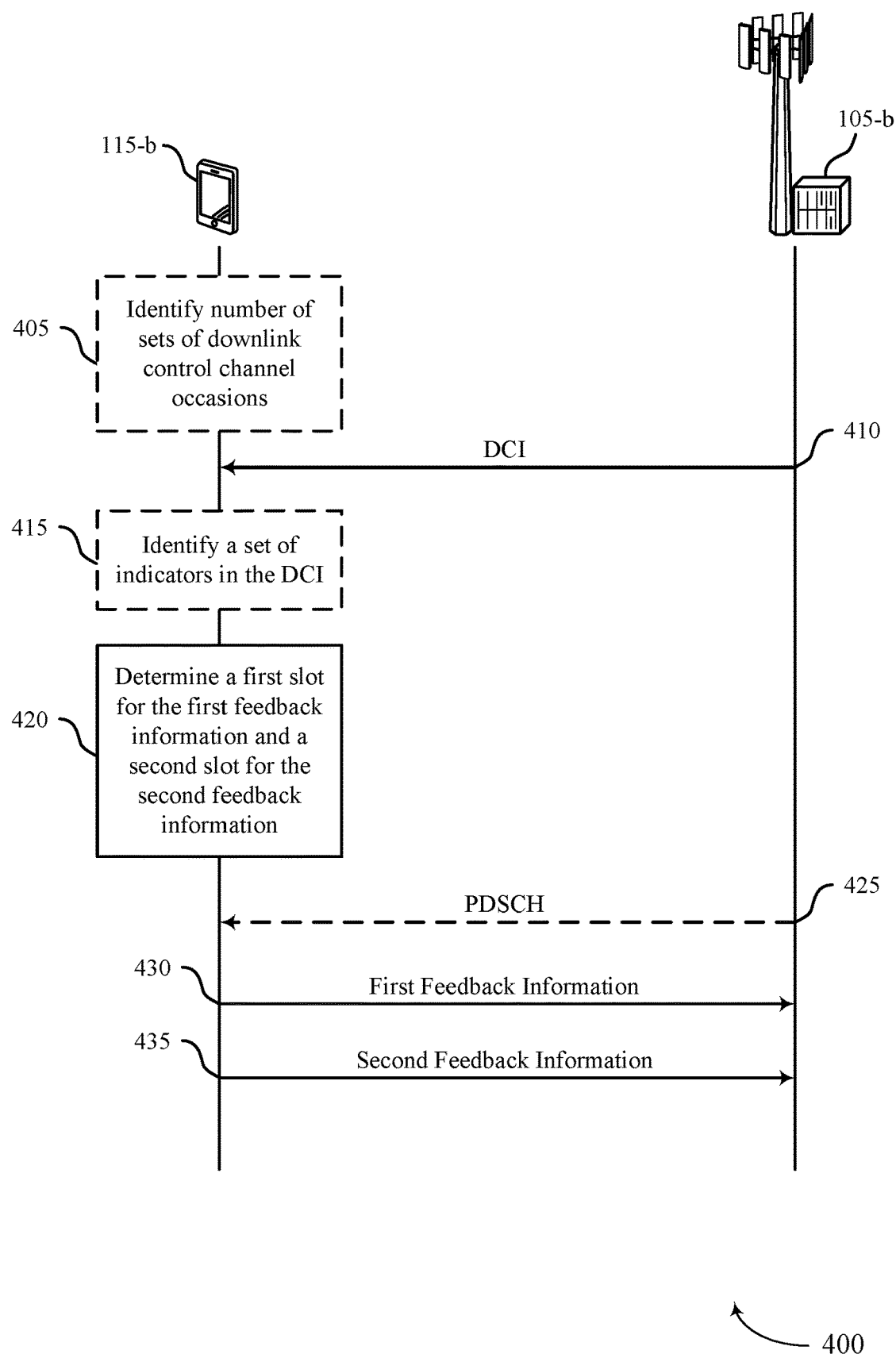
FIGS. 4 and 5 illustrate examples of process flows that support acknowledgement feedback for multi-component carrier scheduling with separate feedback-related control fields in accordance with aspects of the present disclosure.

FIG. 4 illustrates an example of a process flow 400 that supports acknowledgement feedback for multi-component carrier scheduling with separate feedback-related control fields in accordance with aspects of the present disclosure. The process flow 400 may implement aspects of the wireless communications system 100 and 200 described with reference to FIGS. 1 and 2, respectively. For example, the process flow 400 may be implemented by a base station 105-b or a UE 115-b, for example, to reduce power consumption, increase resource utilization, and reduce latency for wireless communications, among other benefits. The base station 105-b and the UE 115-b may be examples of a base station 105 and a UE 115, as described with reference to FIGS. 1 through 3. With reference to FIG. 2, the process flow 400 may be an example of a scenario where the base station 105-b may transmit a DCI that indicates multiple different PUCCH resources for feedback transmissions associated with multiple scheduled physical channels (e.g., multiple PDSCHs).

In the following description of the process flow 400, the operations between the base station 105-b and the UE 115-b may be transmitted in a different order than the example order shown, or the operations performed by the base station 105-b and the UE 115-b may be performed in different orders or at different times. Some operations may also be omitted from the process flow 400, and other operations may be added to the process flow 400.

At 405, in some cases, the UE 115-b may identify a number of sets of downlink control channel occasions (e.g., PDCCH monitoring occasions) for receiving a DCI. In some examples, the number of sets of downlink control channel occasions may include a first set of downlink control channel occasions and a second set of downlink control channel occasions. In some aspects, the first set of downlink control channel occasions may be different than the second set of downlink control channel occasions.

At 410, the base station 105-b may transmit the DCI to the UE 115-b. In some examples, the DCI may jointly schedule a first transmission (e.g., a first physical channel) on a first downlink data channel (e.g., a first PDSCH) of a first component carrier and a second transmission (e.g., a second physical channel) on a second downlink data channel (e.g., a second PDSCH) of a second component carrier. In some aspects, the DCI may indicate a first slot (e.g., a first PUCCH resource or a first slot of a PUCCH resource) that the UE 115-b may use for a first feedback information (e.g., a first ACK information, a first feedback transmission, a first HARQ feedback, or a first PUCCH transmission) associated with (e.g., responsive to) the first transmission and a second slot (e.g., a second PUCCH resource or a second slot of a PUCCH resource) that the UE 115-b may use for a second feedback information (e.g., a second ACK information, a second feedback transmission, a second HARQ feedback, or a second PUCCH transmission) associated with (e.g., responsive to) the second transmission.

At 415, in some cases, the UE 115-b may identify a set of indicators in the DCI. For example, the UE 115-b may identify a number of fields in the DCI associated with feedback-related information that the UE 115-b may use to determine one or more feedback parameters. In some examples, the set of indicators may include at least two DAI fields (e.g., at least a first DAI field and a second DAI field). In some examples, the UE 115-b may identify the first DAI field based on receiving the DCI using the first set of monitoring occasions and may identify the second DAI field based on receiving the DCI using the second set of monitoring occasions.

At 420, the UE 115-b may determine a first slot (e.g., the first PUCCH resource) for the first feedback information and a second slot (e.g., the second PUCCH resource) for the second feedback information. In some examples, the UE 115-b may identify the first slot and the second slot based on the set of indicators in the DCI. For example, the UE 115-b may identify the first slot based on assigning a count to the DCI associated with the first DAI field and may identify the second slot based on assigning a count to the DCI associated with the second DAI field. In some aspects, the first slot may be different than the second slot.

At 425, the base station 105-b may transmit the first transmission and the second transmission (e.g., the first PDSCH and the second PDSCH) on a first component carrier and a second component carrier, respectively. The UE 115-b may attempt to decode the first transmission and the second transmission based on receiving the DCI at 410.

At 430, the UE 115-b may transmit the first feedback information to the base station 105-b based on a result of the decoding operations associated with the first transmission. In some examples, the UE 115-b may transmit the first feedback information in the first slot determined at 420. In some aspects, the UE 115-b may transmit the first feedback information to the base station 105-b based on the power control formula described herein.

At 435, the UE 115-b may transmit the second feedback information to the base station 105-b based on a result of the decoding operations associated with the second transmission. In some examples, the UE 115-b may transmit the second feedback information in the second slot determined at 420. In some aspects, the UE 115-b may transmit the second feedback information to the base station 105-b based on the power control formula described herein.

Figure 5:
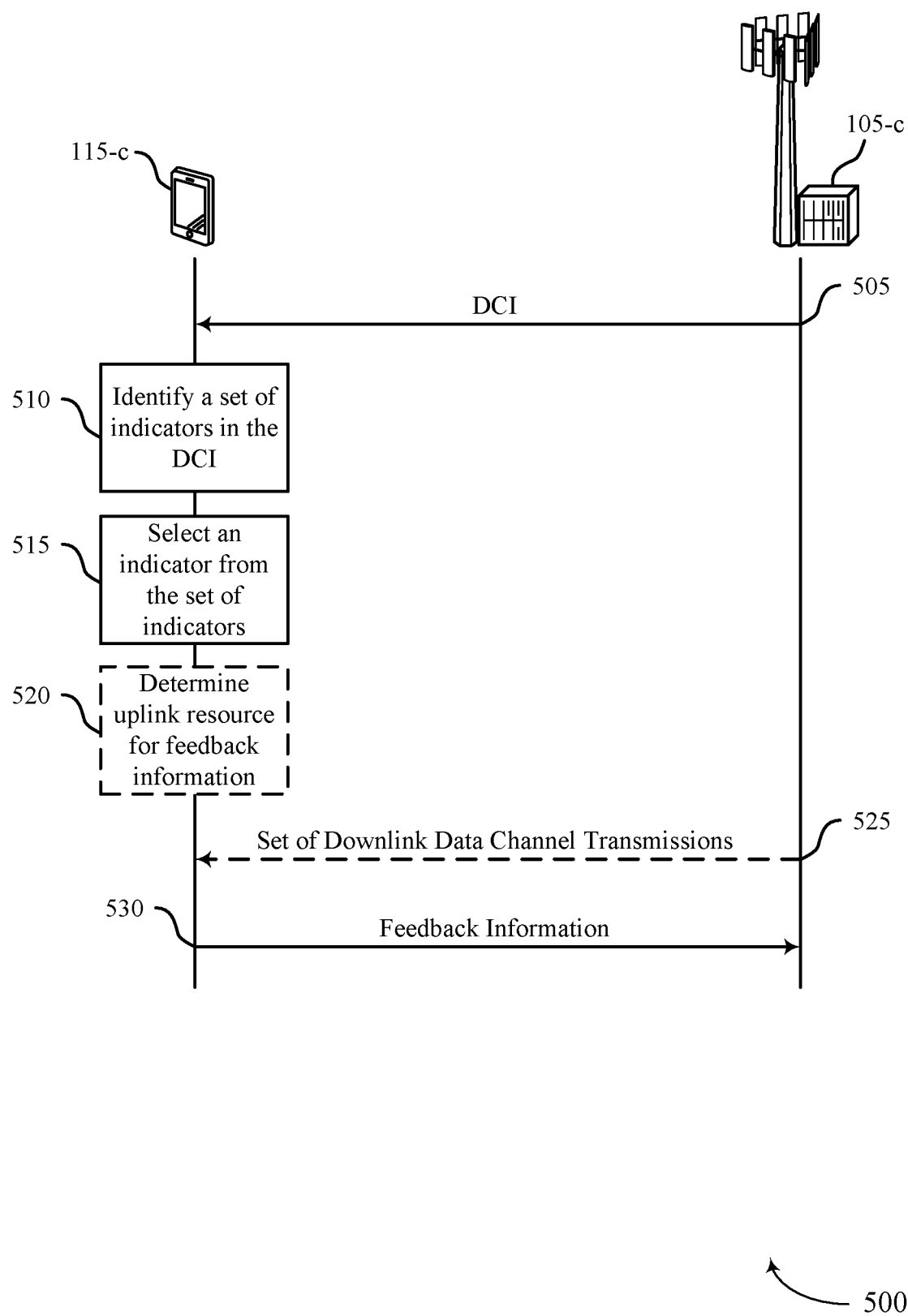

FIG. 5 illustrates an example of a process flow 500 that supports acknowledgement feedback for multi-component carrier scheduling with separate feedback-related control fields in accordance with aspects of the present disclosure. The process flow 500 may implement aspects of the wireless communications system 100 and 200 described with reference to FIGS. 1 and 2, respectively. For example, the process flow 500 may be implemented by a base station 105-c or a UE 115-c, for example, to reduce power consumption, increase resource utilization, and reduce latency for wireless communications, among other benefits. The base station 105-c and the UE 115-c may be examples of a base station 105 and a UE 115, as described with reference to FIGS. 1 through 3. With reference to FIG. 2, the process flow 500 may be an example of a scenario where the base station 105-c may schedule a single PUCCH resource for the UE 115-c to use for feedback transmissions for each of multiple physical channels that the base station 105-c schedules for the UE 115-c.

In the following description of the process flow 500, the operations between the base station 105-c and the UE 115-c may be transmitted in a different order than the example order shown, or the operations performed by the base station 105-c and the UE 115-c may be performed in different orders or at different times. Some operations may also be omitted from the process flow 500, and other operations may be added to the process flow 500.

At 505, the base station 105-c may transmit a DCI (e.g., a set of multiple DCI) to the UE 115-c. In some examples, the DCI may schedule a set of downlink data channel (e.g., PDSCH) transmissions, where each DCI of the set of DCIs identify a same slot (e.g., a same PUCCH resource) for the transmission of feedback information associated with (e.g., responsive to) the set of downlink data channels. In some examples, the DCI may schedule two PDSCHs across two component carriers and the DCI may indicate a single PUCCH resource (e.g., a single slot for PUCCH transmissions) for the UE 115-c to use for feedback information associated with both of the PDSCHs, as described in more detail with reference to FIGS. 2 and 3.

At 510, the UE 115-c may identify a set of indicators in the received set of DCI, where each indicator of the set of indicators may identify uplink resources of an uplink control channel (e.g., a PUCCH). In some examples, the UE 115-c may use the uplink control channel to transmit the feedback information associated with the set of downlink data channel transmissions. In some examples, the set of indicators may include one or more PRI fields. Additionally or alternatively, the set of indicators may be associated with a slot indicator (e.g., a $K_1$ value or a $K_1$ field). In some aspects, the UE 115-c may order the set of indicators based on an ordering rule, which may be based on a downlink control channel occasion (e.g., a PDCCH monitoring occasion index) and a component carrier index, as described herein.

At 515, the UE 115-c may select, based on the ordering rule, an indicator from the set of indicators. In some examples, the selected indicator may be a last PRI field in the DCI. For example, the UE 115-c may identify the PM field in a downlink control channel occasion associated with a largest monitoring occasion index and a largest component carrier index, as described herein.

At 520, in some cases, the UE 115-c may determine the uplink resource (e.g., the slot) of the uplink control channel (e.g., the PUCCH) to use for feedback information transmissions associated with the set of downlink data channel transmissions. In some examples, the UE 115-c may use the selected indicator to identify the uplink resource of the uplink control channel.

At 525, the base station 105-c may transmit the set of downlink data channel transmissions. In some examples, the UE 115-c may attempt to decode the set of downlink data channel transmissions based on receiving the DCI at 505.

At 530, the UE 115-c may transmit feedback information to the base station 105-c. In some examples, the UE 115-c may transmit the feedback information responsive to receiving the set of downlink data channel transmissions.

Figure 6:
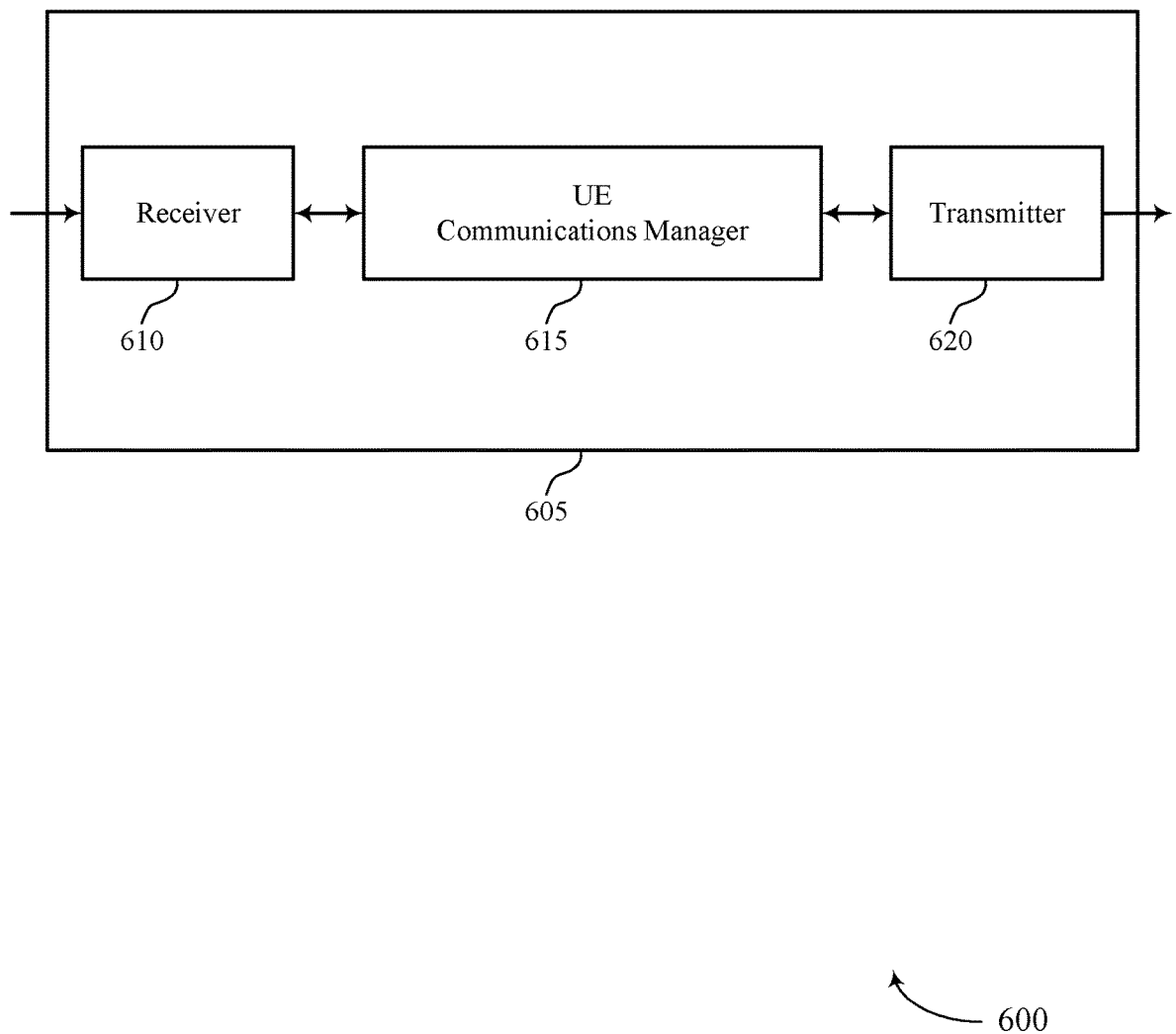
FIGS. 6 and 7 show block diagrams of devices that support acknowledgement feedback for multi-component carrier scheduling with separate feedback-related control fields in accordance with aspects of the present disclosure.

FIG. 6 shows a block diagram 600 of a device 605 that supports acknowledgement feedback for multi-component carrier scheduling with separate feedback-related control fields in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to acknowledgement feedback for multi-component carrier scheduling with separate feedback-related control fields, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmit, on one or more uplink control channels, the first acknowledgement information and the second acknowledgement information.

The UE communications manager 615 may also receive a set of DCI messages scheduling a set of downlink data channel transmissions, each DCI message of the set of DCI messages identifying a same slot for transmission, on an uplink control channel, of feedback information responsive to the set of downlink data channel transmissions, identify a set of indicators in the received set of DCI messages, each indicator of the set of indicators identifying uplink resources of the uplink control channel, at least one DCI message of the set of DCI messages including at least two indicators identifying the uplink resources of the uplink control channel, select, based on an ordering rule, an indicator from the set of indicators, and transmit, on the uplink resource of the uplink control channel identified by the selected indicator, the feedback information responsive to the set of downlink data channel transmissions. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the UE communications manager 615, among other examples herein, may be implemented to realize one or more potential advantages. For example, UE communications manager 615 may increase available battery power, communication quality (e.g., via increased available resources), and decreased communication latency at a wireless device (e.g., a UE 115) by supporting cross component carrier scheduling. The increase in communication quality and decrease in latency may result in increased link performance and decreased overhead based on the cross component carrier scheduling. Accordingly, UE communications manager 615 may save power and increase battery life at a wireless device (e.g., a UE 115) by strategically increasing a quality of communications at a wireless device (e.g., a UE 115).

Figure 7:
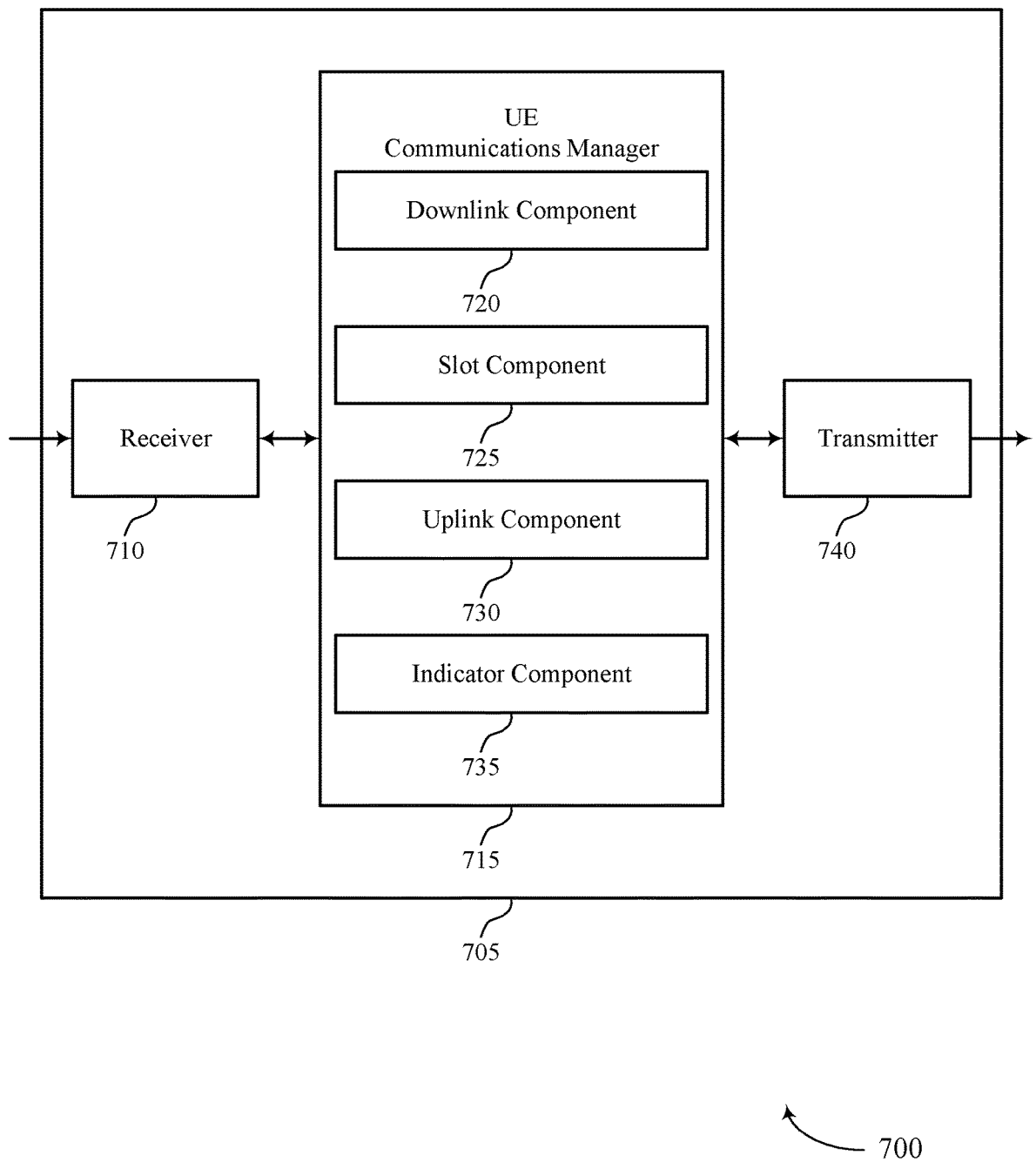

FIG. 7 shows a block diagram 700 of a device 705 that supports acknowledgement feedback for multi-component carrier scheduling with separate feedback-related control fields in accordance with aspects of the present disclosure. The device 705 may be an example of aspects of a device 605, or a UE 115 as described herein. The device 705 may include a receiver 710, a UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to acknowledgement feedback for multi-component carrier scheduling with separate feedback-related control fields, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a downlink component 720, a slot component 725, an uplink component 730, and an indicator component 735. The UE communications manager 715 may be an example of aspects of the UE communications manager 910 described herein.

The downlink component 720 may receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission. The slot component 725 may determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission. The uplink component 730 may transmit, on one or more uplink control channels, the first acknowledgement information and the second acknowledgement information.

The downlink component 720 may receive a set of DCI messages scheduling a set of downlink data channel transmissions, each DCI message of the set of DCI messages identifying a same slot for transmission, on an uplink control channel, of feedback information responsive to the set of downlink data channel transmissions. The indicator component 735 may identify a set of indicators in the received set of DCI messages, each indicator of the set of indicators identifying uplink resources of the uplink control channel, at least one DCI message of the set of DCI messages including at least two indicators identifying the uplink resources of the uplink control channel and select, based on an ordering rule, an indicator from the set of indicators. The uplink component 730 may transmit, on the uplink resource of the uplink control channel identified by the selected indicator, the feedback information responsive to the set of downlink data channel transmissions.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

A processor of a wireless device (e.g., controlling the receiver 710, the transmitter 740, or the transceiver 920 as described with reference to FIG. 9) may increase available battery power, communication quality, and may decrease communication latency. The increased communication quality may increase available battery power and throughput (e.g., via implementation of system components described with reference to FIG. 8) compared to other systems and techniques, for example, that do not support cross component carrier scheduling, which may decrease communication quality and increase power consumption. Further, the processor of the wireless device may identify one or more aspects of a DCI (e.g., or a field thereof) to support the cross component carrier scheduling. The processor of the wireless device may use resources scheduled by the DCI to perform one or more actions that may result in increased communication quality, as well as save power and increase battery life at the wireless device (e.g., by strategically supporting increasing communication quality by supporting the cross component carrier scheduling), among other benefits.

Figure 8:
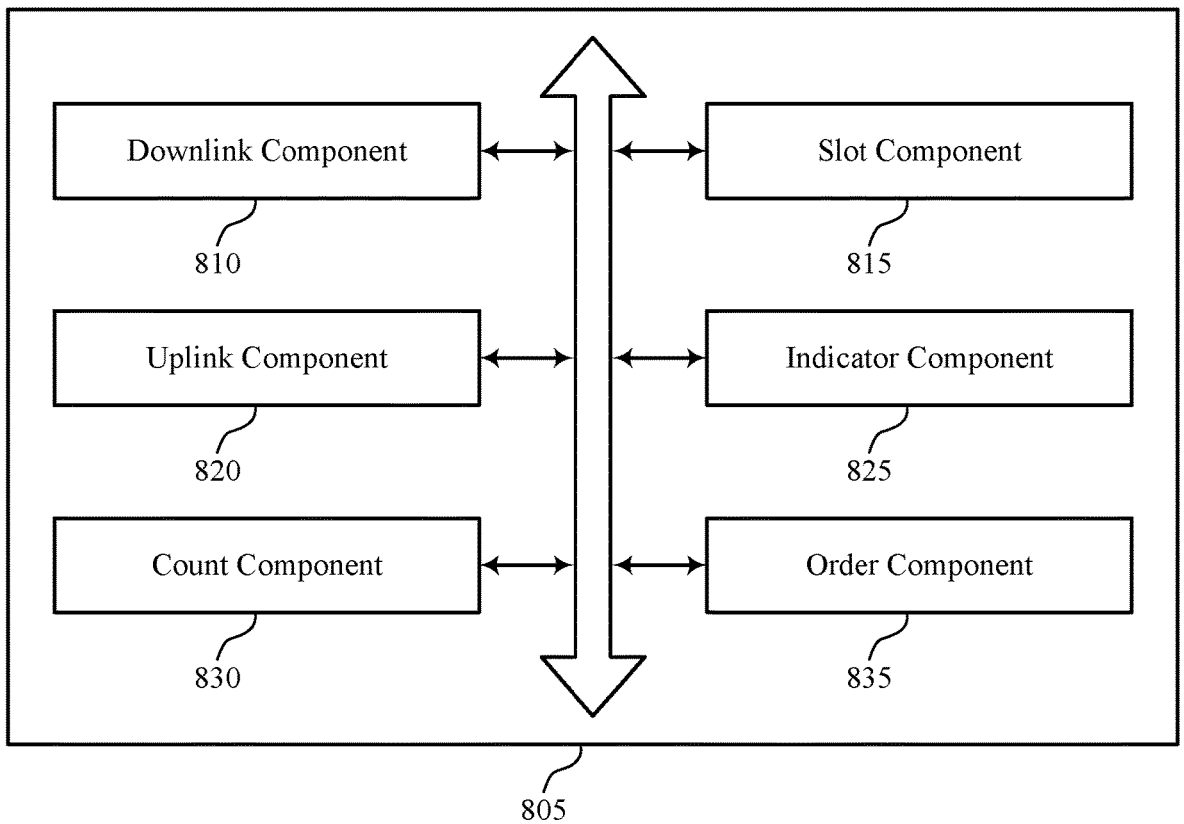
FIG. 8 shows a block diagram of a user equipment (UE) communications manager that supports acknowledgement feedback for multi-component carrier scheduling with separate feedback-related control fields in accordance with aspects of the present disclosure.

FIG. 8 shows a block diagram 800 of a UE communications manager 805 that supports acknowledgement feedback for multi-component carrier scheduling with separate feedback-related control fields in accordance with aspects of the present disclosure. The UE communications manager 805 may be an example of aspects of a UE communications manager 615, a UE communications manager 715, or a UE communications manager 910 described herein. The UE communications manager 805 may include a downlink component 810, a slot component 815, an uplink component 820, an indicator component 825, a count component 830, and an order component 835. Each of these modules may communicate, directly or indirectly, with one another (e.g., via one or more buses).

The downlink component 810 may receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission. In some examples, the downlink component 810 may receive a set of DCI messages scheduling a set of downlink data channel transmissions, each DCI message of the set of DCI messages identifying a same slot for transmission, on an uplink control channel, of feedback information responsive to the set of downlink data channel transmissions. In some examples, the downlink component 810 may receive the DCI message over a set of downlink control channel occasions.

In some cases, the received DCI message is associated with a first set of downlink control channel occasions associated with the first transmission and a second set of downlink control channel occasions associated with the second transmission. In some cases, the first set of downlink control channel occasions is different than the second set of downlink control channel occasions. In some cases, each DCI message associated with the number of DCI messages, including the received DCI message, includes at least two downlink assignment indicators fields, where assigning the count to the received DCI message is based on at least two downlink assignment indicator fields.

The slot component 815 may determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission. In some cases, the first slot is different than the second slot. The uplink component 820 may transmit, on one or more uplink control channels, the first acknowledgement information and the second acknowledgement information. In some examples, the uplink component 820 may transmit, on the uplink resource of the uplink control channel identified by the selected indicator, the feedback information responsive to the set of downlink data channel transmissions.

The indicator component 825 may identify a set of indicators in the received set of DCI messages, each indicator of the set of indicators identifying uplink resources of the uplink control channel, at least one DCI message of the set of DCI messages including at least two indicators identifying the uplink resources of the uplink control channel. In some examples, the indicator component 825 may select, based on an ordering rule, an indicator from the set of indicators. In some examples, the indicator component 825 may identify a set of indicators in the received DCI message. In some examples, the indicator component 825 may determine a count associated with a transmission of the first acknowledgement information and the second acknowledgement information. In some cases, the set of indicators includes at least two downlink assignment indicators. In some cases, the set of indicators includes uplink control channel resource indicators. In some cases, each indicator of the set of indicators is associated with a slot indicator.

The count component 830 may determine a number of DCI messages, including the received DCI message, scheduling multiple downlink data channels, each DCI message associated with the number of DCI messages corresponding to a control format, where the control format schedules at least two transmissions and includes at least two timing offset indicators, the at least two transmissions including the first transmission and the second transmission, and the at least two timing offset indicators including the first timing offset indicator and the second timing offset indicator. In some examples, the count component 830 may assign a count to the received DCI message based on the control format of the received DCI message. In some examples, the count component 830 may determine a power level for transmission of the one or more uplink control channels based on the determined number of DCI messages or the assigned count to the received DCI message, or both.

In some examples, the count component 830 may identify, in the received DCI message, a same slot for a transmission, the transmission including transmitting, on at least one uplink control channel of the one or more uplink control channels, the first acknowledgement information and the second acknowledgement information, where assigning the count to the received DCI message is based on identifying, in the received DCI message, the same slot for the transmission. In some examples, the count component 830 may identify, in the received DCI message, different slots for two or more transmissions, the two or more transmissions including transmitting, on at least two uplink control channels, the first acknowledgement information and the second acknowledgement information, where assigning the count to the received DCI message is based on identifying, in the received DCI message, the different slots for the transmission.

The order component 835 may order the set of indicators in the received set of DCI messages based on a component carrier index of each indicator of the set of indicators. In some cases, the set of DCI messages correspond to a same downlink control channel occasion and ordering the set of indicators in the received set of DCI messages is based on the set of DCI messages corresponding to the same downlink control channel occasion. In some cases, the set of DCI messages correspond to different downlink control channel occasions and ordering the set of indicators in the received set of DCI messages is based on the set of DCI messages corresponding to different downlink control channel occasions.

Figure 9:
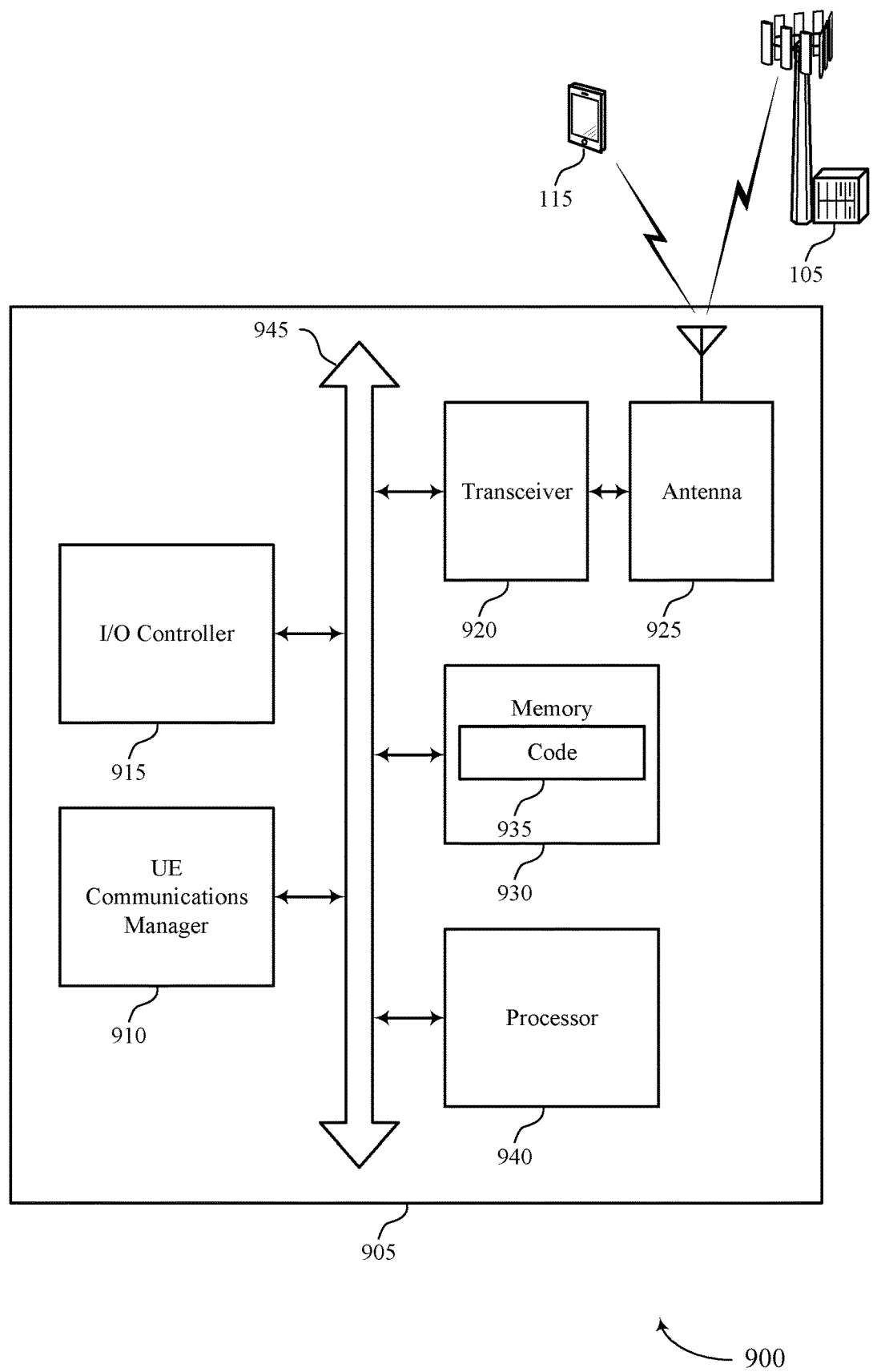
FIG. 9 shows a diagram of a system including a device that supports acknowledgement feedback for multi-component carrier scheduling with separate feedback-related control fields in accordance with aspects of the present disclosure.

FIG. 9 shows a diagram of a system 900 including a device 905 that supports acknowledgement feedback for multi-component carrier scheduling with separate feedback-related control fields in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive a DCI message scheduling a first transmission on a first downlink data channel of a first component carrier and a second transmission on a second downlink data channel of a second component carrier and indicating a first slot for first acknowledgement information associated with the first transmission and a second slot for second acknowledgement information associated with the second transmission, determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission, and transmit, on one or more uplink control channels, the first acknowledgement information and the second acknowledgement information.

The UE communications manager 910 may also receive a set of DCI messages scheduling a set of downlink data channel transmissions, each DCI message of the set of DCI messages identifying a same slot for transmission, on an uplink control channel, of feedback information responsive to the set of downlink data channel transmissions, identify a set of indicators in the received set of DCI messages, each indicator of the set of indicators identifying uplink resources of the uplink control channel, at least one DCI message of the set of DCI messages including at least two indicators identifying the uplink resources of the uplink control channel, select, based on an ordering rule, an indicator from the set of indicators, and transmit, on the uplink resource of the uplink control channel identified by the selected indicator, the feedback information responsive to the set of downlink data channel transmissions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting acknowledgement feedback for multi-component carrier scheduling with separate feedback-related control fields).

Figure 10:
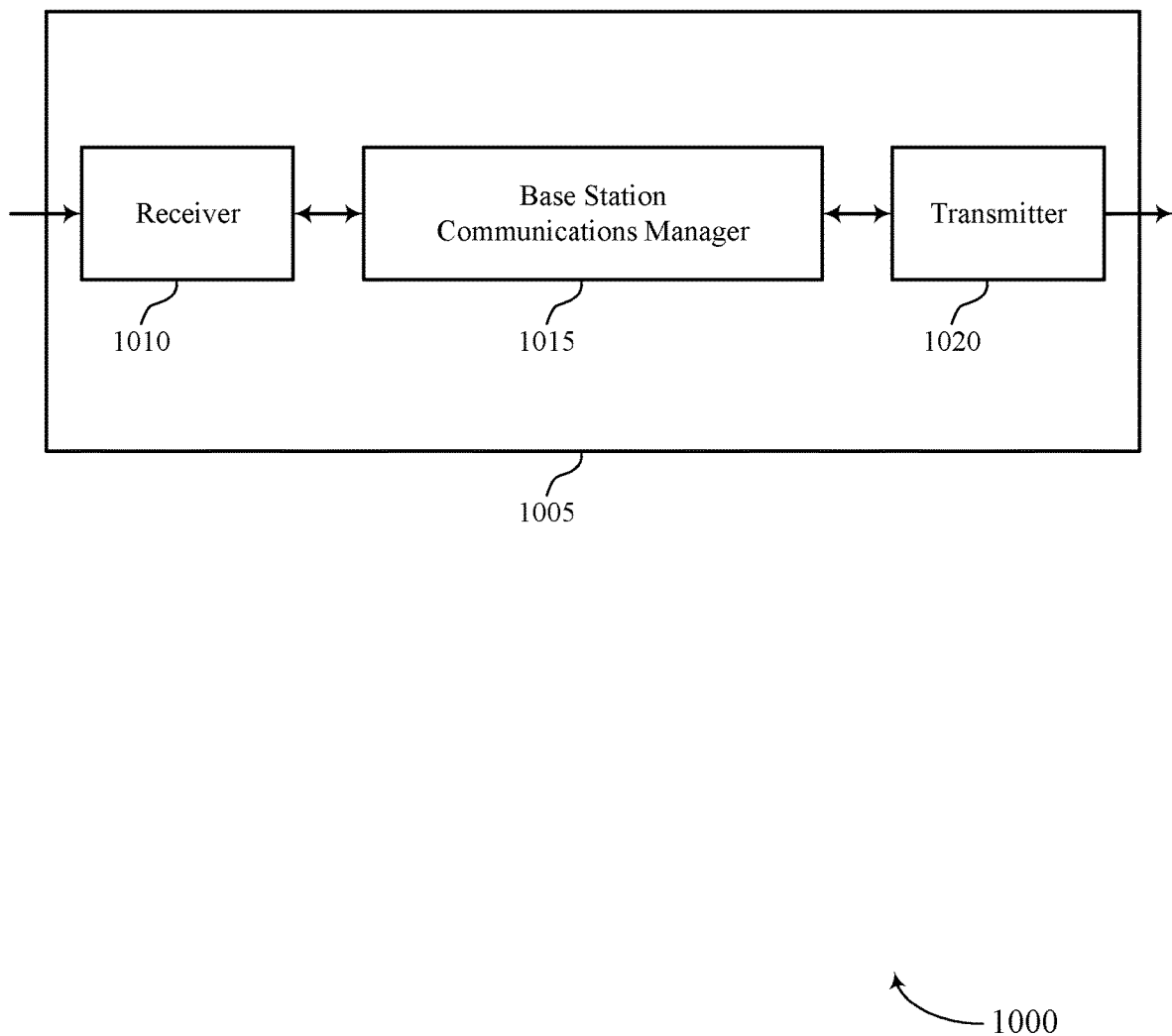
FIGS. 10 and 11 show block diagrams of devices that support acknowledgement feedback for multi-component carrier scheduling with separate feedback-related control fields in accordance with aspects of the present disclosure.

FIG. 10 shows a block diagram 1000 of a device 1005 that supports acknowledgement feedback for multi-component carrier scheduling with separate feedback-related control fields in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to acknowledgement feedback for multi-component carrier scheduling with separate feedback-related control fields, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission and receive, on one or more uplink control channels, the first acknowledgement information and the second acknowledgement information. The base station communications manager 1015 may also transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages including at least two indicators identifying an uplink resource of the uplink control channel and receive, on the uplink resource of the uplink control channel identified by a selected indicator of a set of indicators, the feedback information responsive to the set of downlink data channel transmission. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
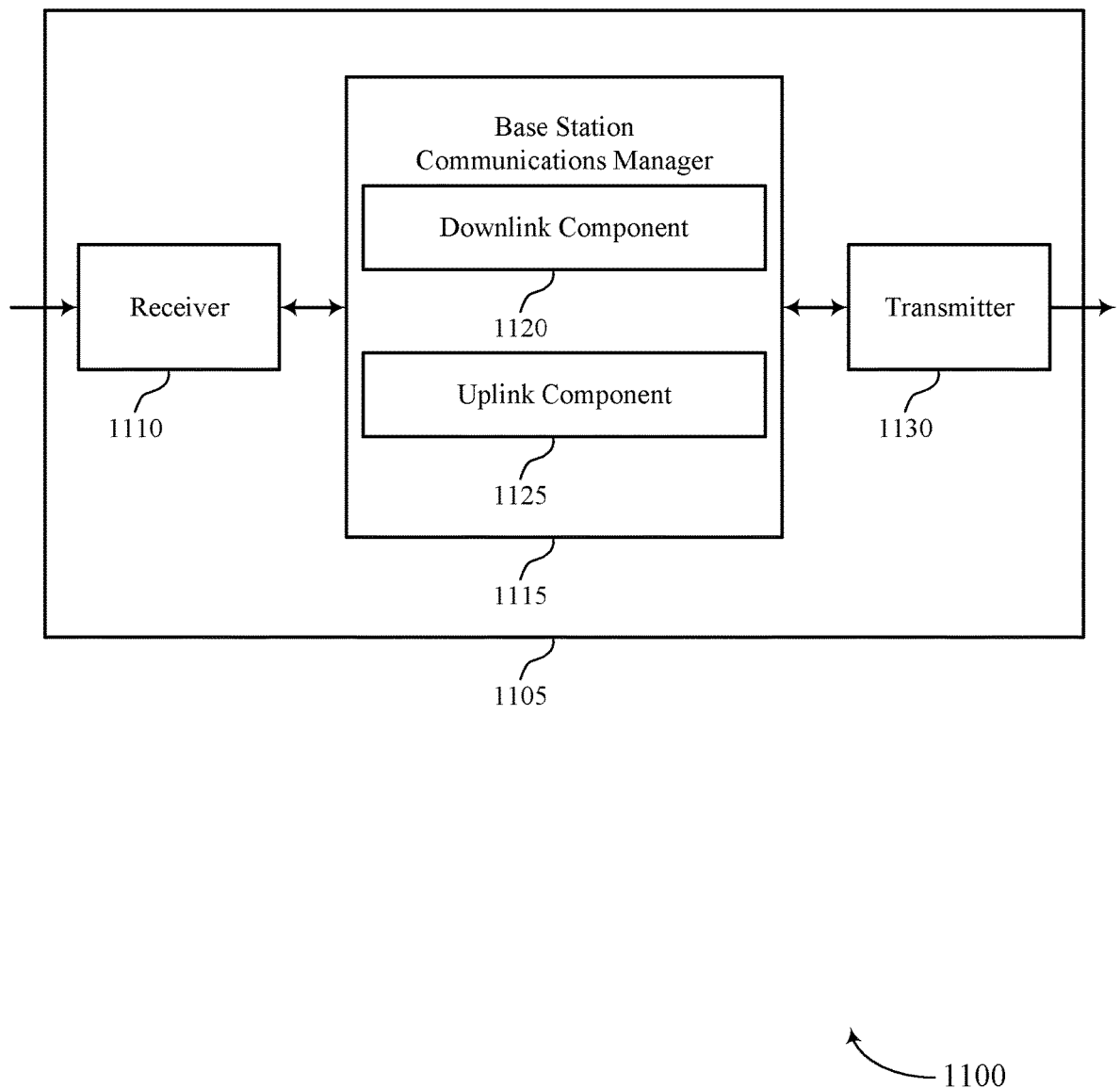

FIG. 11 shows a block diagram 1100 of a device 1105 that supports acknowledgement feedback for multi-component carrier scheduling with separate feedback-related control fields in accordance with aspects of the present disclosure. The device 1105 may be an example of aspects of a device 1005, or a base station 105 as described herein. The device 1105 may include a receiver 1110, a base station communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to acknowledgement feedback for multi-component carrier scheduling with separate feedback-related control fields, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a downlink component 1120 and an uplink component 1125. The base station communications manager 1115 may be an example of aspects of the base station communications manager 1310 described herein.

The downlink component 1120 may transmit a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission. The uplink component 1125 may receive, on one or more uplink control channels, the first acknowledgement information and the second acknowledgement information. The downlink component 1120 may transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages including at least two indicators identifying an uplink resource of the uplink control channel. The uplink component 1125 may receive, on the uplink resource of the uplink control channel identified by a selected indicator of a set of indicators, the feedback information responsive to the set of downlink data channel transmission.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
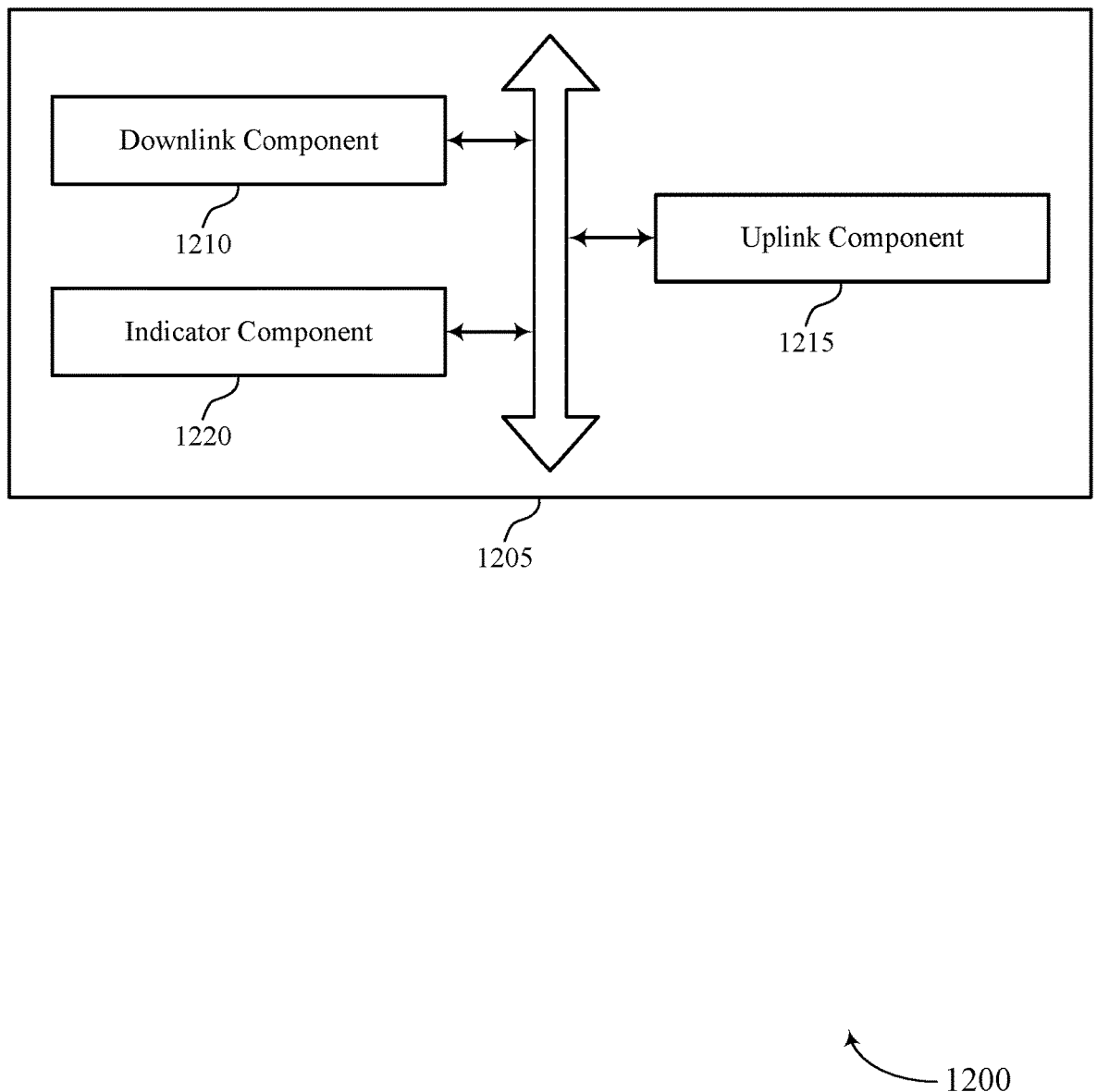
FIG. 12 shows a block diagram of a base station communications manager that supports acknowledgement feedback for multi-component carrier scheduling with separate feedback-related control fields in accordance with aspects of the present disclosure.

FIG. 12 shows a block diagram 1200 of a base station communications manager 1205 that supports acknowledgement feedback for multi-component carrier scheduling with separate feedback-related control fields in accordance with aspects of the present disclosure. The base station communications manager 1205 may be an example of aspects of a base station communications manager 1015, a base station communications manager 1115, or a base station communications manager 1310 described herein. The base station communications manager 1205 may include a downlink component 1210, an uplink component 1215, and an indicator component 1220. Each of these modules may communicate, directly or indirectly, with one another (e.g., via one or more buses).

The downlink component 1210 may transmit a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission. In some examples, the downlink component 1210 may transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages including at least two indicators identifying an uplink resource of the uplink control channel.

In some examples, the downlink component 1210 may transmit the DCI message over a set of downlink control channel occasions. In some cases, the transmitted DCI message is associated with a first set of downlink control channel occasions associated with the first transmission and a second set of downlink control channel occasions associated with the second transmission. In some cases, the first set of downlink control channel occasions is different than the second set of downlink control channel occasions. In some cases, the first slot is different than the second slot. In some cases, the set of DCI messages correspond to a same downlink control channel occasion. In some cases, the set of DCI messages correspond to different downlink control channel occasions.

The uplink component 1215 may receive, on one or more uplink control channels, the first acknowledgement information and the second acknowledgement information. In some examples, the uplink component 1215 may receive, on the uplink resource of the uplink control channel identified by a selected indicator of a set of indicators, the feedback information responsive to the set of downlink data channel transmission. The indicator component 1220 may identify the set of indicators. In some cases, the set of indicators includes uplink control channel resource indicators. In some cases, each indicator of the set of indicators is associated with a slot indicator.

Figure 13:
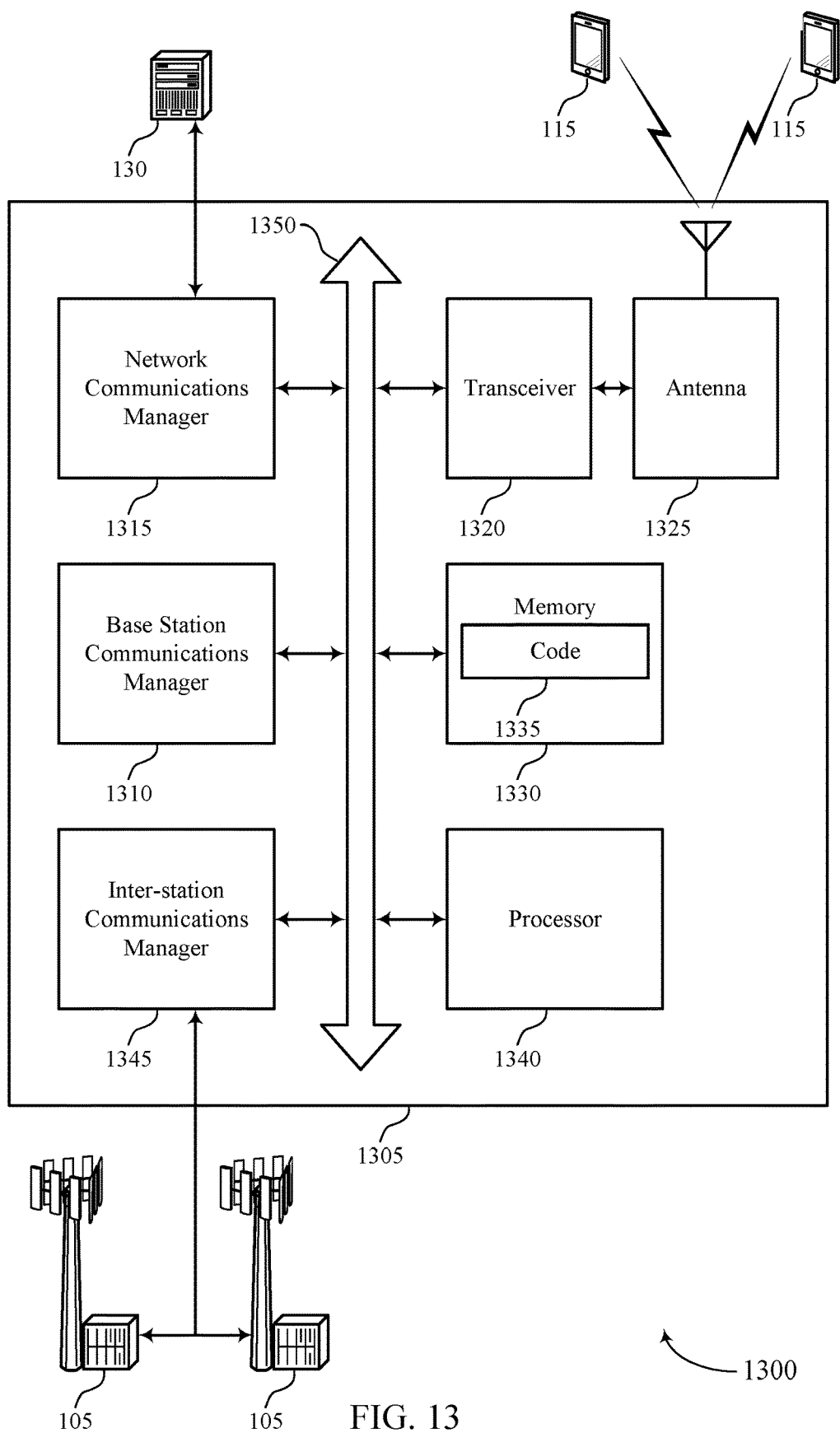
FIG. 13 shows a diagram of a system including a device that supports acknowledgement feedback for multi-component carrier scheduling with separate feedback-related control fields in accordance with aspects of the present disclosure.

FIG. 13 shows a diagram of a system 1300 including a device 1305 that supports acknowledgement feedback for multi-component carrier scheduling with separate feedback-related control fields in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission and receive, on one or more uplink control channels, the first acknowledgement information and the second acknowledgement information. The base station communications manager 1310 may also transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages including at least two indicators identifying an uplink resource of the uplink control channel and receive, on the uplink resource of the uplink control channel identified by a selected indicator of a set of indicators, the feedback information responsive to the set of downlink data channel transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting acknowledgement feedback for multi-component carrier scheduling with separate feedback-related control fields).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
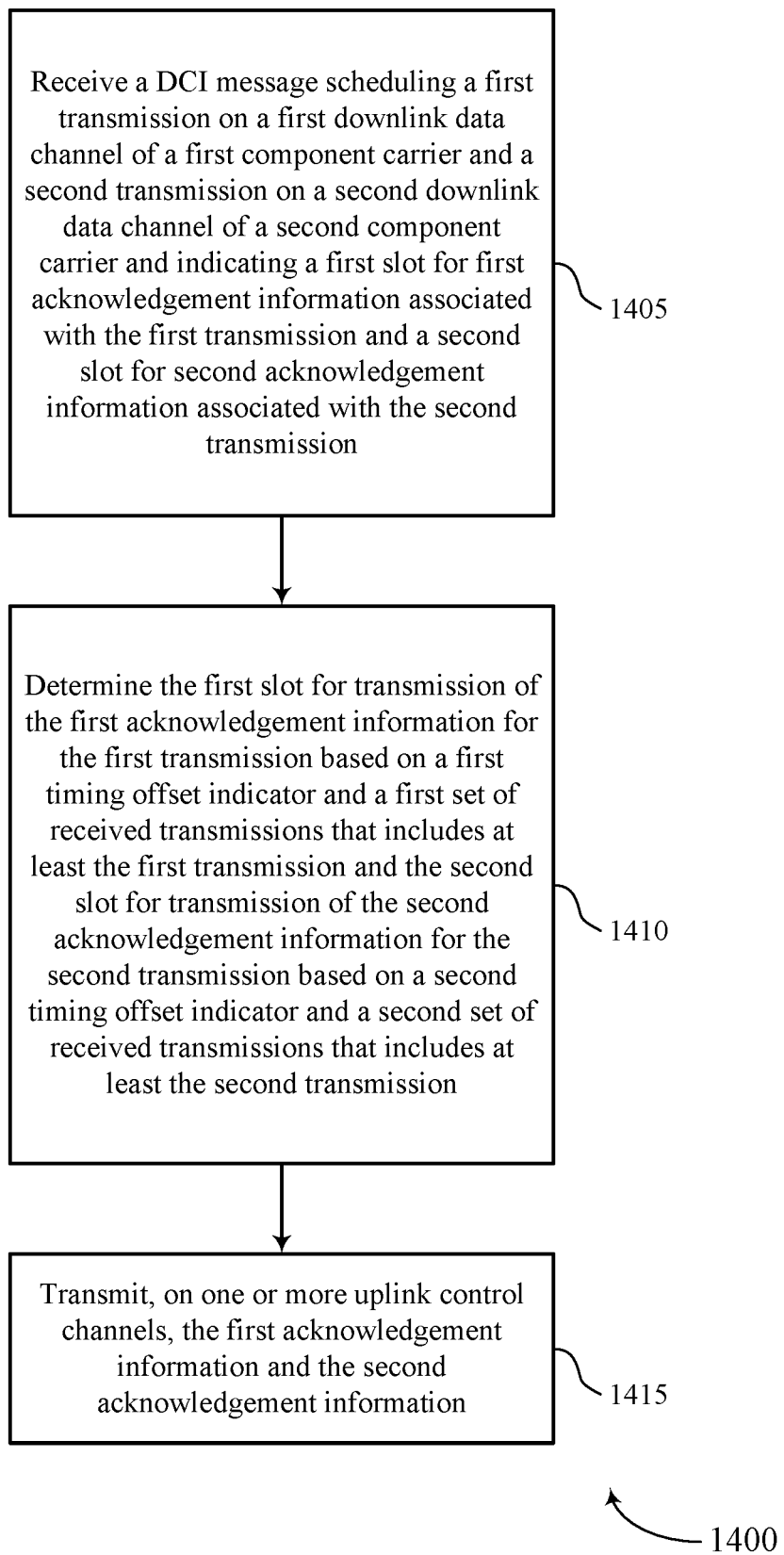
FIGS. 14 through 17 show flowcharts illustrating methods that support acknowledgement feedback for multi-component carrier scheduling with separate feedback-related control fields in accordance with aspects of the present disclosure.

FIG. 14 shows a flowchart illustrating a method 1400 that supports acknowledgement feedback for multi-component carrier scheduling with separate feedback-related control fields in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission. The operations of 1405 may be performed according to the methods described herein. In some examples, aspects of the operations of 1405 may be performed by a downlink component as described with reference to FIGS. 6 through 9.

At 1410, the UE may determine the first slot for transmission of the first acknowledgement information for the first transmission based on a first timing offset indicator and a first set of received transmissions that includes at least the first transmission and the second slot for transmission of the second acknowledgement information for the second transmission based on a second timing offset indicator and a second set of received transmissions that includes at least the second transmission. The operations of 1410 may be performed according to the methods described herein. In some examples, aspects of the operations of 1410 may be performed by a slot component as described with reference to FIGS. 6 through 9.

At 1415, the UE may transmit, on one or more uplink control channels, the first acknowledgement information and the second acknowledgement information. The operations of 1415 may be performed according to the methods described herein. In some examples, aspects of the operations of 1415 may be performed by an uplink component as described with reference to FIGS. 6 through 9.

Figure 15:
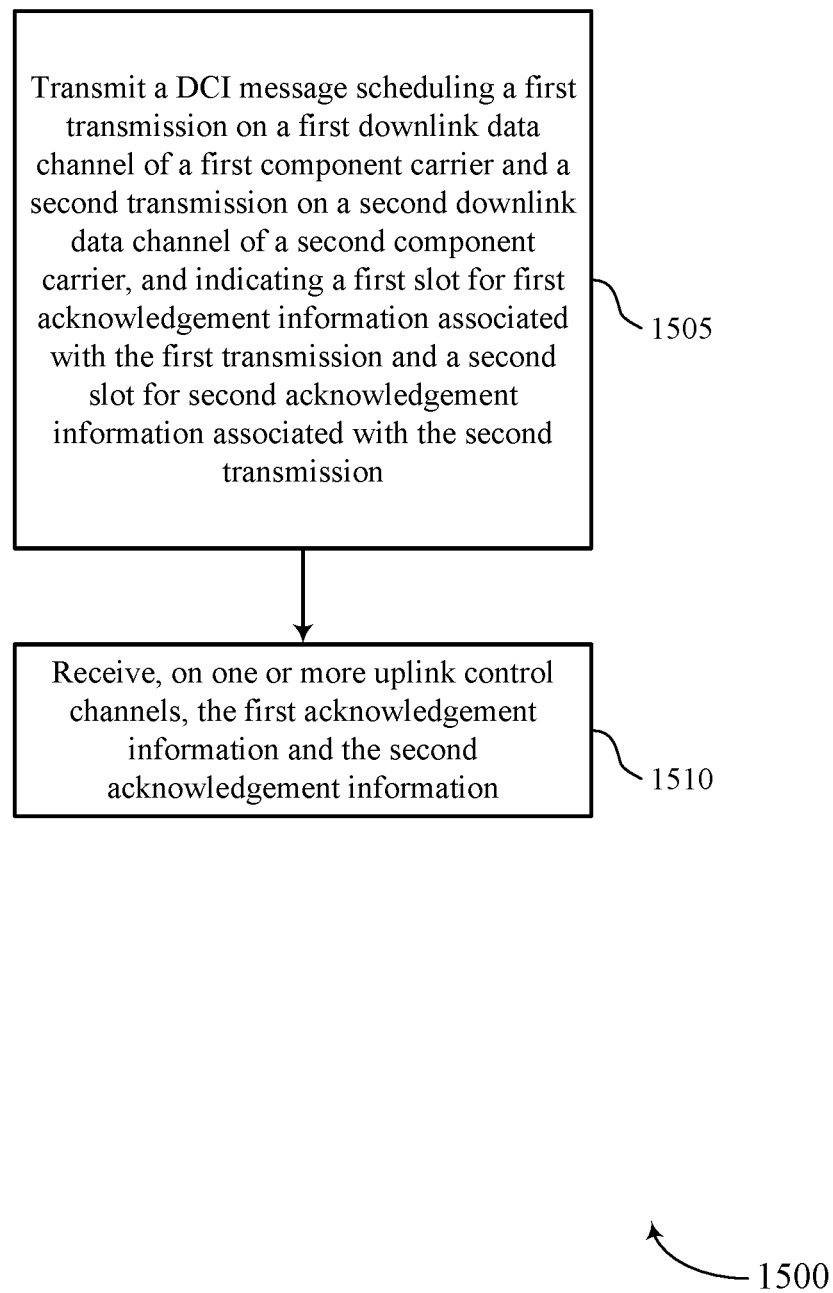

FIG. 15 shows a flowchart illustrating a method 1500 that supports acknowledgement feedback for multi-component carrier scheduling with separate feedback-related control fields in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission. The operations of 1505 may be performed according to the methods described herein. In some examples, aspects of the operations of 1505 may be performed by a downlink component as described with reference to FIGS. 10 through 13.

At 1510, the base station may receive, on one or more uplink control channels, the first acknowledgement information and the second acknowledgement information. The operations of 1510 may be performed according to the methods described herein. In some examples, aspects of the operations of 1510 may be performed by an uplink component as described with reference to FIGS. 10 through 13.

Figure 16:
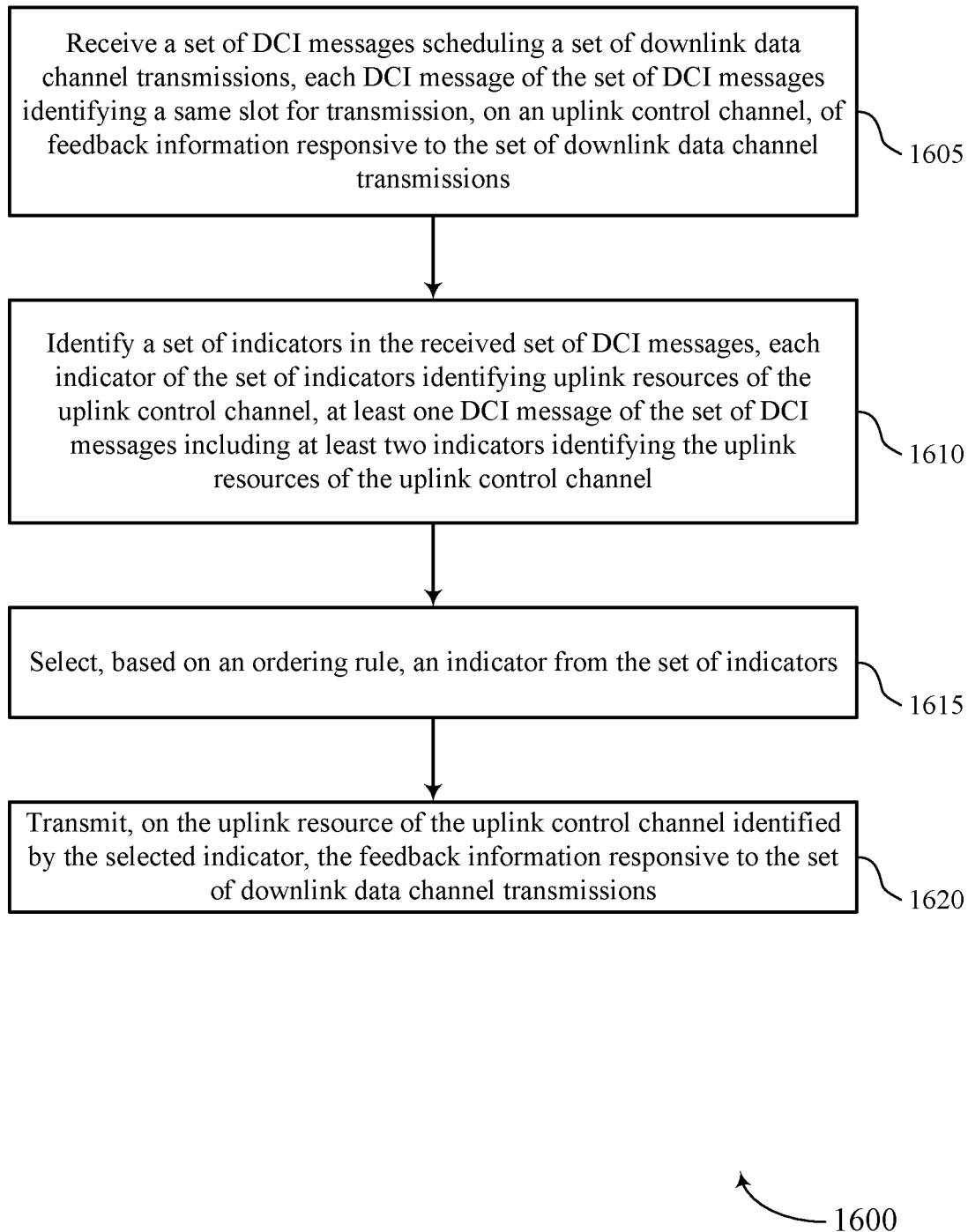

FIG. 16 shows a flowchart illustrating a method 1600 that supports acknowledgement feedback for multi-component carrier scheduling with separate feedback-related control fields in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a set of DCI messages scheduling a set of downlink data channel transmissions, each DCI message of the set of DCI messages identifying a same slot for transmission, on an uplink control channel, of feedback information responsive to the set of downlink data channel transmissions. The operations of 1605 may be performed according to the methods described herein. In some examples, aspects of the operations of 1605 may be performed by a downlink component as described with reference to FIGS. 6 through 9.

At 1610, the UE may identify a set of indicators in the received set of DCI messages, each indicator of the set of indicators identifying uplink resources of the uplink control channel, at least one DCI message of the set of DCI messages including at least two indicators identifying the uplink resources of the uplink control channel. The operations of 1610 may be performed according to the methods described herein. In some examples, aspects of the operations of 1610 may be performed by an indicator component as described with reference to FIGS. 6 through 9.

At 1615, the UE may select, based on an ordering rule, an indicator from the set of indicators. The operations of 1615 may be performed according to the methods described herein. In some examples, aspects of the operations of 1615 may be performed by an indicator component as described with reference to FIGS. 6 through 9.

At 1620, the UE may transmit, on the uplink resource of the uplink control channel identified by the selected indicator, the feedback information responsive to the set of downlink data channel transmissions. The operations of 1620 may be performed according to the methods described herein. In some examples, aspects of the operations of 1620 may be performed by an uplink component as described with reference to FIGS. 6 through 9.

Figure 17:
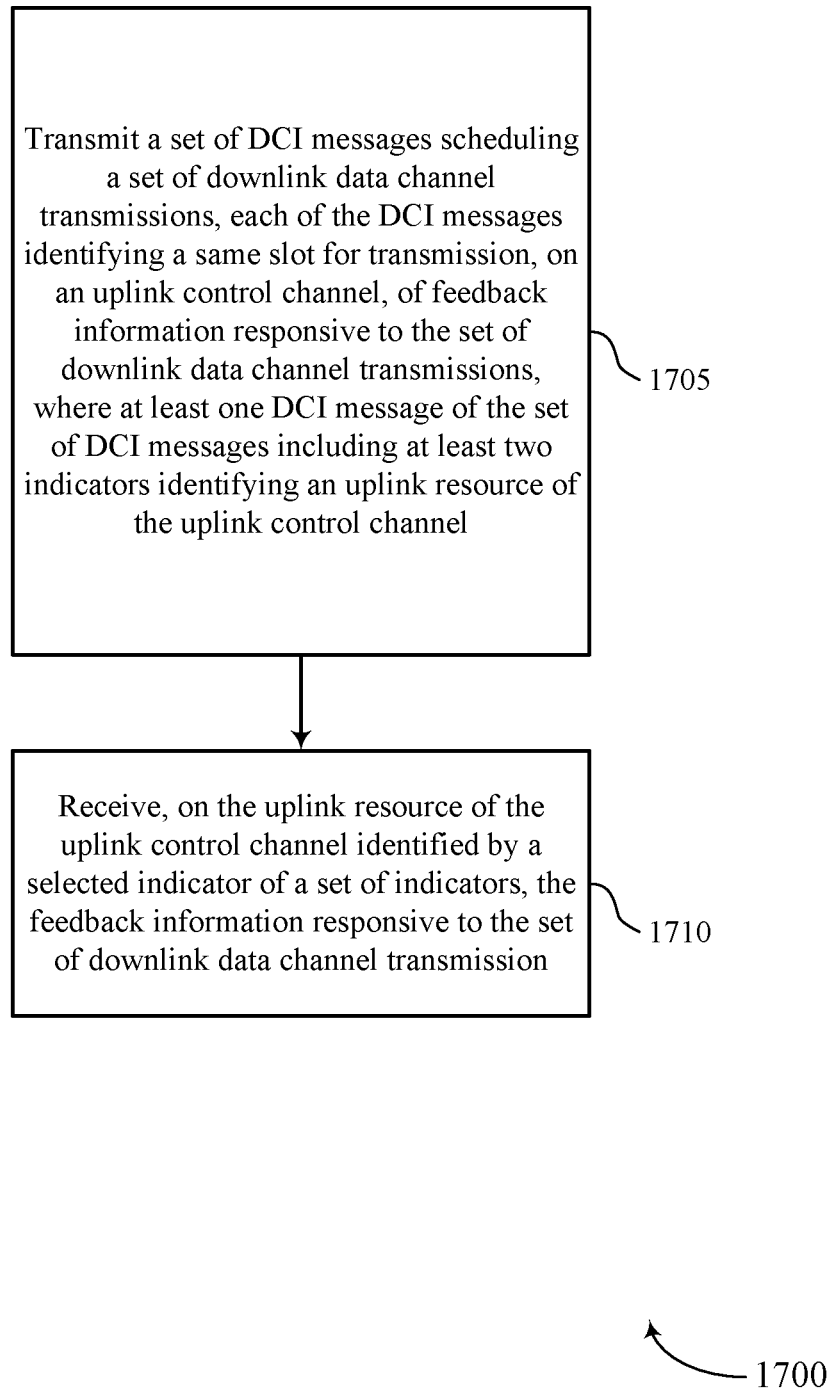

FIG. 17 shows a flowchart illustrating a method 1700 that supports acknowledgement feedback for multi-component carrier scheduling with separate feedback-related control fields in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit a set of DCI messages scheduling a set of downlink data channel transmissions, each of the DCI messages identifying a same slot for transmission, on an uplink control channel, of feedback information responsive to the set of downlink data channel transmissions, where at least one DCI message of the set of DCI messages including at least two indicators identifying an uplink resource of the uplink control channel. The operations of 1705 may be performed according to the methods described herein. In some examples, aspects of the operations of 1705 may be performed by a downlink component as described with reference to FIGS. 10 through 13.

At 1710, the base station may receive, on the uplink resource of the uplink control channel identified by a selected indicator of a set of indicators, the feedback information responsive to the set of downlink data channel transmission. The operations of 1710 may be performed according to the methods described herein. In some examples, aspects of the operations of 1710 may be performed by an uplink component as described with reference to FIGS. 10 through 13.

Aspect 1: A method for wireless communications at a UE, comprising: receiving a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission; determining the first slot for transmission of the first acknowledgement information for the first transmission based at least in part on a first timing offset indicator and a first set of received transmissions that includes at least the first transmission and the second slot for transmission of the second acknowledgement information for the second transmission based at least in part on a second timing offset indicator and a second set of received transmissions that includes at least the second transmission; and transmitting, on one or more uplink control channels, the first acknowledgement information and the second acknowledgement information.

Aspect 2: The method of aspect 1, wherein receiving the DCI message comprises: receiving the DCI message over a set of downlink control channel occasions.

Aspect 3: The method of any of aspects 1 through 2, wherein the received DCI message is associated with a first set of downlink control channel occasions associated with the first transmission and a second set of downlink control channel occasions associated with the second transmission.

Aspect 4: The method of aspect 3, wherein the first set of downlink control channel occasions is different than the second set of downlink control channel occasions.

Aspect 5: The method of any of aspects 1 through 4, wherein the first slot is different than the second slot.

Aspect 6: The method of any of aspects 1 through 5, further comprising: identifying a set of indicators in the received DCI message; and determining a count associated with a transmission of the first acknowledgement information and the second acknowledgement information.

Aspect 7: The method of aspect 6, wherein the set of indicators comprises at least two downlink assignment indicators.

Aspect 8: The method of any of aspects 1 through 7, further comprising: determining a number of DCI messages, including the received DCI message, scheduling multiple downlink data channels, each DCI message associated with the number of DCI messages corresponding to a control format, wherein the control format schedules at least two transmissions and includes at least two timing offset indicators, the at least two transmissions comprising the first transmission and the second transmission, and the at least two timing offset indicators comprising the first timing offset indicator and the second timing offset indicator; assigning a count to the received DCI message based at least in part on the control format of the received DCI message; and determining a power level for transmission of the one or more uplink control channels based at least in part on the determined number of DCI messages or the assigned count to the received DCI message, or both.

Aspect 9: The method of aspect 8, further comprising: identifying, in the received DCI message, a same slot for a transmission, the transmission comprising transmitting, on at least one uplink control channel of the one or more uplink control channels, the first acknowledgement information and the second acknowledgement information, wherein assigning the count to the received DCI message is based at least in part on identifying, in the received DCI message, the same slot for the transmission.

Aspect 10: The method of aspect 8, further comprising: identifying, in the received DCI message, different slots for two or more transmissions, the two or more transmissions comprising transmitting, on at least two uplink control channels, the first acknowledgement information and the second acknowledgement information, wherein assigning the count to the received DCI message is based at least in part on identifying, in the received DCI message, the different slots for the transmission.

Aspect 11: The method of any of aspects 8 through 10, wherein each DCI message associated with the number of DCI messages, including the received DCI message, comprises at least two downlink assignment indicators fields, assigning the count to the received DCI message is based at least in part on at least two downlink assignment indicator fields.

Aspect 12: A method for wireless communications at a base station, comprising: transmitting a DCI message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission; and receiving, on one or more uplink control channels, the first acknowledgement information and the second acknowledgement information.

Aspect 13: The method of aspect 12, wherein transmitting the DCI message comprises: transmitting the DCI message over a set of downlink control channel occasions.

Aspect 14: The method of any of aspects 12 through 13, wherein the transmitted DCI message is associated with a first set of downlink control channel occasions associated with the first transmission and a second set of downlink control channel occasions associated with the second transmission.

Aspect 15: The method of aspect 14, wherein the first set of downlink control channel occasions is different than the second set of downlink control channel occasions.

Aspect 16: The method of any of aspects 12 through 15, wherein the first slot is different than the second slot.

Aspect 17: A method for wireless communications at a UE, comprising: receiving a plurality of DCI messages scheduling a plurality of downlink data channel transmissions, each DCI message of the plurality of DCI messages identifying a same slot for transmission, on an uplink control channel, of feedback information responsive to the plurality of downlink data channel transmissions; identifying a set of indicators in the received plurality of DCI messages, each indicator of the set of indicators identifying uplink resources of the uplink control channel, at least one DCI message of the plurality of DCI messages including at least two indicators identifying the uplink resources of the uplink control channel; selecting, based at least in part on an ordering rule, an indicator from the set of indicators; and transmitting, on the uplink resource of the uplink control channel identified by the selected indicator, the feedback information responsive to the plurality of downlink data channel transmissions.

Aspect 18: The method of aspect 17, further comprising: ordering the set of indicators in the received plurality of DCI messages based at least in part on a component carrier index of each indicator of the set of indicators.

Aspect 19: The method of aspect 18, wherein the plurality of DCI messages correspond to a same downlink control channel occasion, and ordering the set of indicators in the received plurality of DCI messages is based at least in part on the plurality of DCI messages corresponding to the same downlink control channel occasion.

Aspect 20: The method of aspect 18, wherein the plurality of DCI messages correspond to different downlink control channel occasions, and ordering the set of indicators in the received plurality of DCI messages is based at least in part on the plurality of DCI messages corresponding to different downlink control channel occasions.

Aspect 21: The method of any of aspects 17 through 20, wherein the set of indicators comprises uplink control channel resource indicators.

Aspect 22: The method of any of aspects 17 through 21, wherein each indicator of the set of indicators is associated with a slot indicator.

Aspect 23: A method for wireless communications at a base station, comprising: transmitting a plurality of DCI messages scheduling a plurality of downlink data channel transmissions, each of the DCI messages identifying a same slot for transmission, on an uplink control channel, of feedback information responsive to the plurality of downlink data channel transmissions, wherein at least one DCI message of the plurality of DCI messages including at least two indicators identifying an uplink resource of the uplink control channel; and receiving, on the uplink resource of the uplink control channel identified by a selected indicator of a set of indicators, the feedback information responsive to the plurality of downlink data channel transmission.

Aspect 24: The method of aspect 23, wherein the plurality of DCI messages correspond to a same downlink control channel occasion.

Aspect 25: The method of aspect 23, wherein the plurality of DCI messages correspond to different downlink control channel occasions.

Aspect 26: The method of any of aspects 23 through 25, wherein the set of indicators comprises uplink control channel resource indicators.

Aspect 27: The method of any of aspects 23 through 26, wherein each indicator of the set of indicators is associated with a slot indicator.

Aspect 28: An apparatus for wireless communications at a UE, comprising a processor; memory coupled with the processor; and instructions stored in the memory and executable by the processor to cause the apparatus to perform a method of any of aspects 1 through 11.

Aspect 29: An apparatus for wireless communications at a UE, comprising at least one means for performing a method of any of aspects 1 through 11.

Aspect 30: A non-transitory computer-readable medium storing code for wireless communications at a UE, the code comprising instructions executable by a processor to perform a method of any of aspects 1 through 11.

Aspect 31: An apparatus for wireless communications at a base station, comprising a processor; memory coupled with the processor; and instructions stored in the memory and executable by the processor to cause the apparatus to perform a method of any of aspects 12 through 16.

Aspect 32: An apparatus for wireless communications at a base station, comprising at least one means for performing a method of any of aspects 12 through 16.

Aspect 33: A non-transitory computer-readable medium storing code for wireless communications at a base station, the code comprising instructions executable by a processor to perform a method of any of aspects 12 through 16.

Aspect 34: An apparatus for wireless communications at a UE, comprising a processor; memory coupled with the processor; and instructions stored in the memory and executable by the processor to cause the apparatus to perform a method of any of aspects 17 through 22.

Aspect 35: An apparatus for wireless communications at a UE, comprising at least one means for performing a method of any of aspects 17 through 22.

Aspect 36: A non-transitory computer-readable medium storing code for wireless communications at a UE, the code comprising instructions executable by a processor to perform a method of any of aspects 17 through 22.

Aspect 37: An apparatus for wireless communications at a base station, comprising a processor; memory coupled with the processor; and instructions stored in the memory and executable by the processor to cause the apparatus to perform a method of any of aspects 23 through 27.

Aspect 38: An apparatus for wireless communications at a base station, comprising at least one means for performing a method of any of aspects 23 through 27.

Aspect 39: A non-transitory computer-readable medium storing code for wireless communications at a base station, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a single downlink control information message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission;
   determining the first slot for transmission of the first acknowledgement information for the first transmission based at least in part on a first timing offset indicator and a first set of received transmissions that includes at least the first transmission and the second slot for transmission of the second acknowledgement information for the second transmission based at least in part on a second timing offset indicator and a second set of received transmissions that includes at least the second transmission; and
   transmitting, on one or more uplink control channels, the first acknowledgement information and the second acknowledgement information.

2. The method of claim 1, wherein receiving the single downlink control information message comprises:
   receiving the single downlink control information message over a set of downlink control channel occasions.

3. The method of claim 1, wherein the received single downlink control information message is associated with a first set of downlink control channel occasions associated with the first transmission and a second set of downlink control channel occasions associated with the second transmission.

4. The method of claim 3, wherein the first set of downlink control channel occasions is different than the second set of downlink control channel occasions.

5. The method of claim 1, wherein the first slot is different than the second slot.

6. The method of claim 1, further comprising:
   identifying a set of indicators in the received single downlink control information message; and
   determining a count associated with a transmission of the first acknowledgement information and the second acknowledgement information.

7. The method of claim 6, wherein the set of indicators comprises at least two downlink assignment indicators.

8. The method of claim 1, further comprising:
   determining a number of downlink control information messages, including the received single downlink control information message, scheduling multiple downlink data channels, each downlink control information message associated with the number of downlink control information messages corresponding to a control format, wherein the control format schedules at least two transmissions and includes at least two timing offset indicators, the at least two transmissions comprising the first transmission and the second transmission, and the at least two timing offset indicators comprising the first timing offset indicator and the second timing offset indicator;
   assigning a count to the received single downlink control information message based at least in part on the control format of the received single downlink control information message; and
   determining a power level for transmission of the one or more uplink control channels based at least in part on the determined number of downlink control information messages or the assigned count to the received single downlink control information message, or both.

9. The method of claim 8, further comprising:
   identifying, in the received single downlink control information message, a same slot for a transmission, the transmission comprising transmitting, on at least one uplink control channel of the one or more uplink control channels, the first acknowledgement information and the second acknowledgement information,
   wherein assigning the count to the received single downlink control information message is based at least in part on identifying, in the received single downlink control information message, the same slot for the transmission.

10. The method of claim 8, further comprising:
    identifying, in the received single downlink control information message, different slots for two or more transmissions, the two or more transmissions comprising transmitting, on at least two uplink control channels, the first acknowledgement information and the second acknowledgement information,
    wherein assigning the count to the received single downlink control information message is based at least in part on identifying, in the received single downlink control information message, the different slots for the transmission.

11. The method of claim 8, wherein each downlink control information message associated with the number of downlink control information messages, including the received single downlink control information message, comprises at least two downlink assignment indicators fields, wherein assigning the count to the received single downlink control information message is based at least in part on at least two downlink assignment indicator fields.

12. A method for wireless communications at a base station, comprising:
    transmitting a single downlink control information message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission; and receiving, on one or more uplink control channels, the first acknowledgement information and the second acknowledgement information.

13. The method of claim 12, wherein transmitting the single downlink control information message comprises:
transmitting the single downlink control information message over a set of downlink control channel occasions.

14. The method of claim 12, wherein the transmitted single downlink control information message is associated with a first set of downlink control channel occasions associated with the first transmission and a second set of downlink control channel occasions associated with the second transmission.

15. The method of claim 14, wherein the first set of downlink control channel occasions is different than the second set of downlink control channel occasions.

16. The method of claim 12, wherein the first slot is different than the second slot.

17. An apparatus for wireless communications, comprising:
a processor;
memory in electronic communication with the processor; and
instructions stored in the memory, wherein the instructions are executable by the processor to:
receive a single downlink control information message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission;
determine the first slot for transmission of the first acknowledgement information for the first transmission based at least in part on a first timing offset indicator and a first set of received transmissions that includes at least the first transmission and the second slot for transmission of the second acknowledgement information for the second transmission based at least in part on a second timing offset indicator and a second set of received transmissions that includes at least the second transmission; and
transmit, on one or more uplink control channels, the first acknowledgement information and the second acknowledgement information.

18. The apparatus of claim 17, wherein the instructions executable by the processor to receive the downlink control information comprise instructions executable by the processor to:
receive the downlink control information message over a set of downlink control channel occasions.

19. The apparatus of claim 17, wherein the received single downlink control information message is associated with a first set of downlink control channel occasions associated with the first transmission and a second set of downlink control channel occasions associated with the second transmission.

20. The apparatus of claim 19, wherein the first set of downlink control channel occasions is different than the second set of downlink control channel occasions.

21. The apparatus of claim 17, wherein the first slot is different than the second slot.

22. The apparatus of claim 17, wherein the instructions are further executable by the processor to:

identify a set of indicators in the received single downlink control information message; and
determine a count associated with a transmission of the first acknowledgement information and the second acknowledgement information.

23. The apparatus of claim 22, wherein the set of indicators comprises at least two downlink assignment indicators.

24. The apparatus of claim 17, wherein the instructions are further executable by the processor to:
determine a number of downlink control information messages, including the received single downlink control information message, scheduling multiple downlink data channels, each downlink control information message associated with the number of downlink control information messages corresponding to a control format, wherein the control format schedules at least two transmissions and includes at least two timing offset indicators, the at least two transmissions comprising the first transmission and the second transmission, and the at least two timing offset indicators comprising the first timing offset indicator and the second timing offset indicator;
assign a count to the received single downlink control information message based at least in part on the control format of the received single downlink control information message; and
determine a power level for transmission of the one or more uplink control channels based at least in part on the determined number of downlink control information messages or the assigned count to the received single downlink control information message, or both.

25. The apparatus of claim 24, wherein the instructions are further executable by the processor to:
identify, in the received single downlink control information message, a same slot for a transmission, the transmission comprising transmitting, on at least one uplink control channel of the one or more uplink control channels, the first acknowledgement information and the second acknowledgement information,
wherein assigning the count to the received single downlink control information message is based at least in part on identifying, in the received single downlink control information message, the same slot for the transmission.

26. The apparatus of claim 24, wherein the instructions are further executable by the processor to:
identify, in the received single downlink control information message, different slots for two or more transmissions, the two or more transmissions comprising transmitting, on at least two uplink control channels, the first acknowledgement information and the second acknowledgement information,
wherein assigning the count to the received single downlink control information message is based at least in part on identifying, in the received single downlink control information message, the different slots for the transmission.

27. The apparatus of claim 24, wherein each downlink control information message associated with the number of downlink control information messages, including the received single downlink control information message, comprises at least two downlink assignment indicators fields, wherein assigning the count to the received single downlink control information message is based at least in part on at least two downlink assignment indicator fields.

28. An apparatus for wireless communications, comprising:

a processor;

memory in electronic communication with the processor; and instructions stored in the memory, wherein the instructions are executable by the processor to:

transmit a single downlink control information message scheduling a first transmission on a first downlink data channel of a first component carrier and a second transmission on a second downlink data channel of a second component carrier, and indicating a first slot for first acknowledgement information associated with the first transmission and a second slot for second acknowledgement information associated with the second transmission; and receive, on one or more uplink control channels, the first acknowledgement information and the second acknowledgement information.

29. The apparatus of claim 28, wherein the instructions executable by the processor to transmit the single downlink control information message comprise instructions executable by the processor to:

transmit the single downlink control information message over a set of downlink control channel occasions.

30. The apparatus of claim 28, wherein the transmitted single downlink control information message is associated with a first set of downlink control channel occasions associated with the first transmission and a second set of downlink control channel occasions associated with the second transmission.

* * * * *